(12) United States Patent
Mentzer

(10) Patent No.: US 10,068,354 B2
(45) Date of Patent: Sep. 4, 2018

(54) OBTAINING AND DISPLAYING AGRICULTURAL DATA

(71) Applicant: Deere & Company, Moline, IL (US)

(72) Inventor: Matt Mentzer, Eldridge, IA (US)

(73) Assignee: Deere & Company, Moline, IL (US)

( * ) Notice: Subject to any disclaimer, the term of this patent is extended or adjusted under 35 U.S.C. 154(b) by 201 days.

(21) Appl. No.: 14/146,460

(22) Filed: Jan. 2, 2014

(65) Prior Publication Data

US 2015/0187109 A1 Jul. 2, 2015

(51) Int. Cl.
*G09G 5/00* (2006.01)
*G06T 11/00* (2006.01)

(52) U.S. Cl.
CPC .................................. *G06T 11/00* (2013.01)

(58) Field of Classification Search
None
See application file for complete search history.

(56) References Cited

U.S. PATENT DOCUMENTS

| | | | | |
|---|---|---|---|---|
| 5,543,788 A * | 8/1996 | Mikuni | ................... | G01C 21/32 340/286.14 |
| 5,721,679 A * | 2/1998 | Monson | ............... | A01B 79/005 345/7 |
| 5,812,962 A * | 9/1998 | Kovac | ....................... | E03F 7/12 701/532 |
| 5,991,687 A * | 11/1999 | Hale | .................... | A01B 79/005 342/357.31 |
| 6,930,715 B1 * | 8/2005 | Mower | ................ | G01C 21/165 348/207.99 |
| 7,777,747 B1 * | 8/2010 | Krenz | .................... | A01K 29/00 345/501 |
| 8,145,330 B2 * | 3/2012 | Emoto | ..................... | A01G 7/00 47/17 |
| 8,150,617 B2 * | 4/2012 | Manber | ............. | G01C 21/3644 340/990 |
| 8,200,246 B2 * | 6/2012 | Khosravy | .......... | G06Q 30/0241 455/456.3 |
| 9,036,056 B2 * | 5/2015 | Ohtsuka | ............. | H04N 5/23206 348/115 |
| 9,058,633 B2 * | 6/2015 | Lindores | ................ | G06Q 10/06 |
| 2011/0066952 A1 * | 3/2011 | Kinch | .................... | A01K 29/00 715/744 |
| 2011/0279446 A1 * | 11/2011 | Castro | .................... | G01C 21/20 345/419 |
| 2012/0105475 A1 * | 5/2012 | Tseng | ................. | G01C 21/3611 345/633 |

(Continued)

FOREIGN PATENT DOCUMENTS

| | | |
|---|---|---|
| CN | 102663397 A | 9/2012 |
| CN | 202696660 U | 1/2013 |
| KR | 1100835987 B1 | 6/2008 |

OTHER PUBLICATIONS

Suprem et al., A review on application of technology systems, standards and interfaces for agriculture and food sector, Computer Standards and Interfaces, 2013, pp. 355-364.*

*Primary Examiner* — M Good Johnson
(74) *Attorney, Agent, or Firm* — Joseph R. Kelly; Kelly, Holt & Christenson PLLC

(57) ABSTRACT

An image of an agricultural item is captured on a mobile device. Agricultural data is received that corresponds geographically to the agricultural item. Visual indicia are displayed that are indicative of the received agricultural data.

10 Claims, 19 Drawing Sheets

(56) References Cited

U.S. PATENT DOCUMENTS

| | | | |
|---|---|---|---|
| 2012/0194553 A1* | 8/2012 | Osterhout | G02B 27/0093 345/633 |
| 2013/0060473 A1* | 3/2013 | Tomida | A01G 25/167 702/3 |
| 2013/0076909 A1* | 3/2013 | Marti | G06F 3/002 348/164 |
| 2013/0124239 A1 | 5/2013 | Rosa et al. | |
| 2013/0185104 A1* | 7/2013 | Klavins | G06Q 10/063 705/7.12 |
| 2013/0187952 A1* | 7/2013 | Berkovich | G01S 5/16 345/633 |
| 2013/0221091 A1* | 8/2013 | Koo | G06Q 10/06 235/375 |
| 2014/0089045 A1* | 3/2014 | Johnson | G06Q 30/0205 705/7.31 |
| 2014/0136286 A1* | 5/2014 | Hovis | A01B 69/00 705/7.34 |
| 2014/0168412 A1* | 6/2014 | Shulman | H04N 7/18 348/89 |
| 2016/0209648 A1* | 7/2016 | Haddick | G02B 27/0093 |

\* cited by examiner

OBTAINING AND DISPLAYING AGRICULTURAL DATA

FIELD OF THE DISCLOSURE

The present disclosure relates to agriculture. More specifically, the present disclosure relates to an infrastructure for enhancing decision making in agriculture.

BACKGROUND

In order to be successful in the field of agriculture, a farmer normally needs to make a relatively large number of decisions each year. Those decisions may determine how successful the farmer will be in that given year.

The decisions can be quite wide ranging. For instance, the farmer can make decisions as to what types of crops to plant in a given year, when to plant them, how much fertilizer to apply, and when to apply it, what types of pest or weed control agents are to be applied (and when), among a wide variety of other decisions. These are just examples of decisions that are made by a farmer.

Mobile computing devices are currently in wide use. Such computing devices include tablet computers, hand held computers, smart phones, and personal digital assistants, to name a few. Such mobile devices are often equipped with functionality that can be used to download and run mobile applications. They often include communication components that can be used to perform a relatively wide variety of different kinds of communication, such as communication using the cellular telephone network, using a wireless local area network (such as WiFi), as well as even using a wired connection (such as Ethernet or others). In general, such mobile devices include functionality that allows them to exchange data, or connect to, a wide area network (such as the Internet) wirelessly using radio waves or using other communication techniques. In addition, such mobile devices often include image capture components, such as cameras, and position and orientation systems that allow them to calculate their own position and orientation.

The discussion above is merely provided for general background information and is not intended to be used as an aid in determining the scope of the claimed subject matter.

SUMMARY

An image of an agricultural item is captured on a mobile device. Agricultural data is received that corresponds geographically to the agricultural item. Visual indicia are displayed that are indicative of the received agricultural data. This Summary is provided only to introduce some concepts in a simplified form. The concepts are further described below in the Detailed Description. This Summary is not intended to identify either key features or essential features of the claimed subject matter, nor is it intended to be used as an aid in determining the scope of the claimed subject matter. Further, the claimed subject matter is not limited to implementations that solve any or all disadvantages noted in the background.

DETAILED DESCRIPTION

While the background section mentioned some decisions that are made by a farmer, a host of other decisions must also be made throughout the growing season, and even after the growing season. For instance, during the growing season, the farmer may wish to evaluate the progress of various crops to determine whether additional fertilizer or pest or weed control agents should be applied. The farmer may also wish to identify pests and weeds and other plants, in order to determine what types of control agents should be applied. After the growing season, the farmer may wish to analyze yield data in order to determine whether changes should be made during the next growing season.

All of these types of decisions are also influenced by a wide variety of other data. For instance, all of these decisions may be influenced by the weather that was experienced during that year. They may also be influenced by the different soil types that reside in a given field. The decisions may be influenced by the type of equipment that the farmer is using, the types of hybrids or plants that the farmer is planting, and a whole host of other data.

Currently, some farmers attempt to track and consider all of this information, in making their decisions, in a wide variety of different ways. Some farmers simply rely on their memory in order to make these decisions. Other farmers attempt to keep track of various items of information using a plurality of different spreadsheets on one or more different computing devices (such as a laptop or desktop computer). Such farmers often attempt to access data over a large area network (such as the Internet) in order to augment the data used to make their decisions. However, this type of information gathering is cumbersome, time consuming, and can be error prone. It is also relatively imprecise.

Figure 1A:
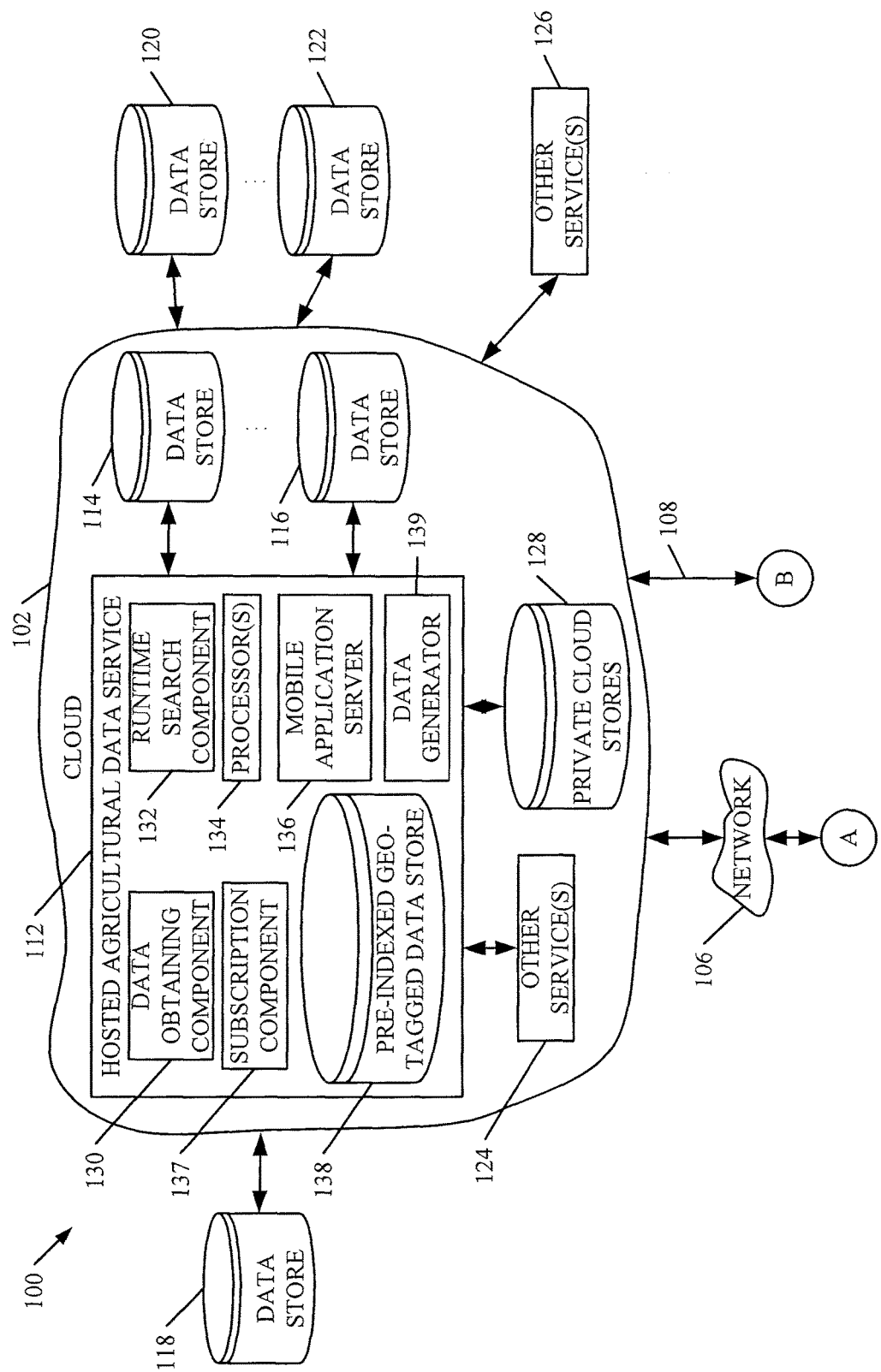
FIGS. 1A and 1B (collectively FIG. 1) show a block diagram of one illustrative agricultural data architecture.
Figure 1B:
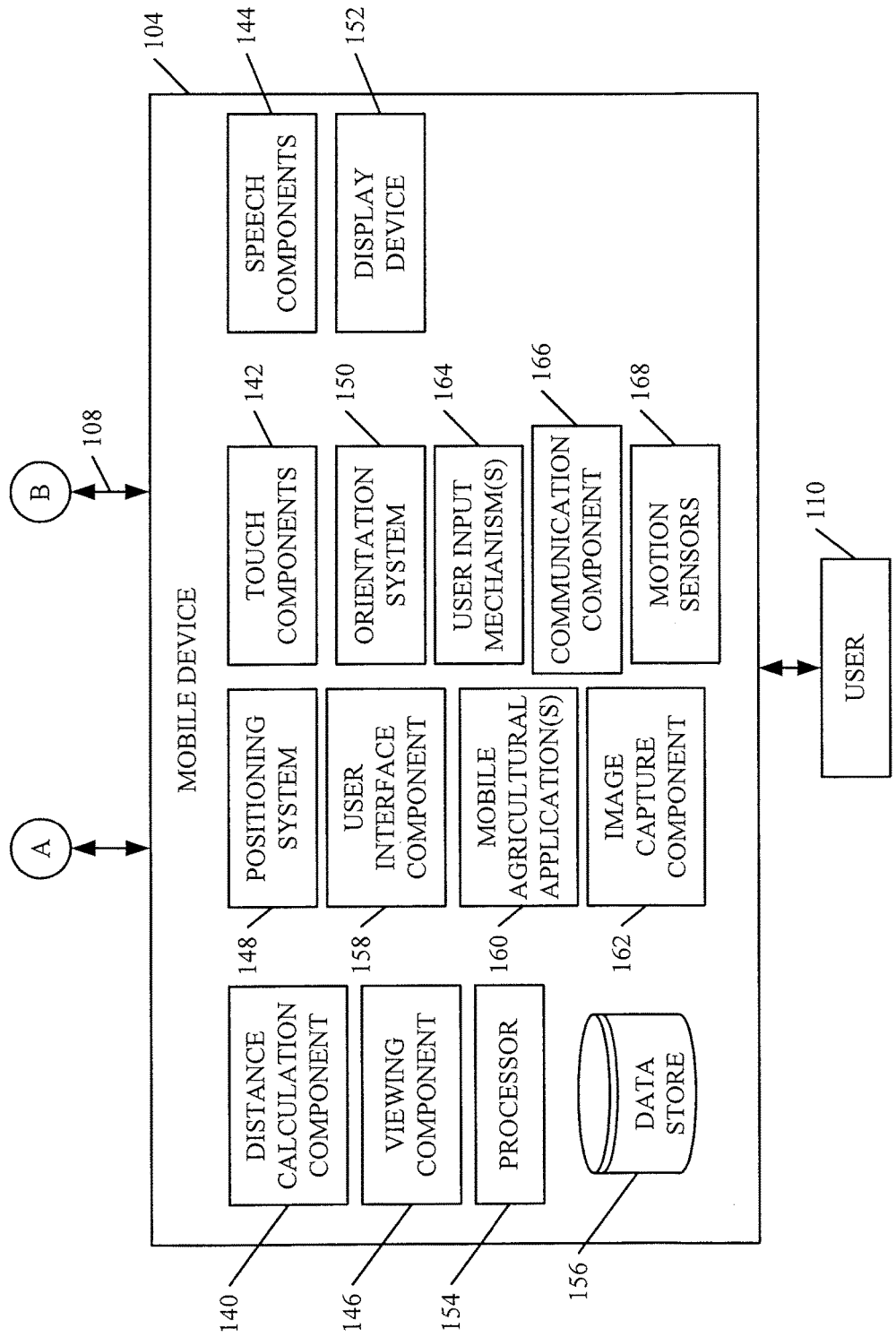

FIG. 1 is a block diagram of one illustrative agricultural data architecture 100. Architecture 100 includes cloud 102 and mobile device 104. FIG. 1 shows that mobile device 104 can access various components of cloud 102 through network 106 (such as a wide area network, a local area network, etc.) or using cellular communications or in other ways, as indicated by arrow 108.

A user 110 illustratively uses mobile device 104 to access a hosted agricultural data service 112 in cloud 102. Service 112 can access data stores 114-116, also in cloud 102, or data stores 118, 120 and 122 which are located in other systems or devices, outside of cloud 102. FIG. 1 also shows that hosted data service 112 can access other services 124 in cloud 102, or still additional services 126, that are provided outside of cloud 102.

In addition, FIG. 1 shows that cloud 102 includes private cloud stores 128 which can store private data of various users 110. In the embodiment described herein, user 110 is illustratively a farmer that has a private cloud store 128 that stores agricultural information for the given farmer 110. Private cloud store 128 is not generally accessible by other, non-authorized, people.

In one embodiment, hosted agricultural data service 112 illustratively includes data obtaining component 130, runtime search component 132, one or more processors (such as computer processors or servers) 134, mobile application server 136, subscription component 137, pre-indexed, geo-tagged data store 138 and data generator 139. These items will each be described in more detail below.

Mobile device 104 can take a wide variety of different forms, some of which are described below with respect to FIGS. 9-14. In the embodiment shown in FIG. 1, mobile device 104 illustratively includes distance calculation component 140, touch components 142, speech components 144, viewing component 146, positioning system 148, orientation system 150, display device 152, processor 154, data store 156, user interface component 158, one or more mobile agricultural applications 160, image capture component 162, user input mechanisms 164, communication component 166 and one or more motion sensors 168.

Before describing the overall operation of architecture 100 in more detail, a brief description of some of the items and components shown in FIG. 1 will first be provided. Hosted agricultural data service 112 is shown in a cloud computing architecture. In an example embodiment, cloud computing provides computation, software, data access and storage services that do not require end-user knowledge of the physical location or configuration of the system that delivers that service. In various embodiments, cloud computing delivers the services over a wide area network, such as the Internet, using appropriate protocols. For instance, cloud computing providers deliver applications over a wide area network and they can be accessed through a web browser or any other computing component. Software or components of architecture 100, as well as corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provide substantially seamless pooling of resources as well as a reduced need, on the part of the entity using cloud computing, to manage and configure underlying hardware and software infrastructure.

A public cloud is managed by a vendor and typically supports multiple consumers using the same infrastructure. Also, a public could, as opposed to a private cloud, can free up the end-users from managing the hardware and software. A private cloud may be managed by the organization itself, and the infrastructure is not typically shared with other organizations. The organization still maintains the hardware, to some extent, such as installations and repairs, etc. In the example shown in FIG. 1, all of the elements and data stores for hosted agricultural data service 112 are shown as being disposed in cloud 102. However, in another embodiment, portions of hosted agricultural data service 112, or the data sources that it maintains (such as data store 138) can be located outside of cloud 102, and accessed by service 112. For instance, they can be hosted at a remote site by a service, or they can be provided as a service through a cloud or accessed by a connection service that resides in the cloud. All of these architectures are contemplated herein.

In service 112, data crawler component 130 illustratively crawls various websites or data stores to obtain relevant data. Data crawler component 130 intermittently crawls the websites and data stores to obtain updated information, and indexes that data and loads it in pre-indexed, geo-tagged data store 138. A wide variety of different data can be loaded in data store 138. Some examples of this are discussed in greater detail below with respect to FIG. 4.

Runtime search component 132 illustratively performs runtime searches for data which is not pre-indexed and stored in data store 138. Mobile application server 136 illustratively serves the various mobile applications that are downloaded by the various mobile devices 104.

On mobile device 104, viewing component 146 is illustratively any type of viewing component which user 110 can use to obtain a view of his or her surroundings. For instance, when user 110 is a farmer standing in a field, viewing component 146 may be a camera lens, or another viewer, that allows the farmer to view a piece of ground in the field. Distance calculation component 140 illustratively calculates a distance between mobile device 104 and the piece of ground being viewed. Positioning system 148 calculates a position of mobile device 104. User interface component 158 illustratively generates user interface displays with user input mechanisms that user 110 can interact with in order to control and manipulate mobile agricultural application 160 and other portions of mobile device 104. Applications 160 are illustratively mobile applications that are downloaded from service 112 and that are served by mobile application server 136. They illustratively allow user 110 to interact with, and manipulate, service 112. Image capture component 162 can be a camera or other component that illustratively allows user 110 to capture the image viewed through viewing component 146. Touch components 142 illustratively allow the user interface displays displayed to user 110 to be displayed on a display device 152, such as a touch sensitive display device. Touch components 142 enable the user to provide user inputs through the user interface displays using touch gestures. Speech components 144 illustratively allow the user to provide inputs using speech commands. Orientation system 150 illustratively calculates the orientation of mobile device 104. For instance, it can include a compass, gyroscopes, or other components that can be used to calculate the orientation of the mobile device. User input mechanisms 164 can either be hardware or software user input mechanisms. For instance, they can be hardware keypads or keyboards, a thumb pad, joysticks, buttons, switches, etc. In addition, they can be virtual keyboards or keypads that are actuated using touch gestures. They can also be user actuatable display elements, such as icons, links, buttons, text boxes, check boxes, drop down menus, etc. Motion sensors 168 can be used to sense when mobile device 104 is being moved. For instance, accelerometers can detect whether a mobile device 104 is being panned, tilted or otherwise moved. Similarly, motion sensors 168 can include image analysis components that perform pixel-level image analysis on the image displayed in viewing component 146 to determine whether mobile device 104 is being panned to the right, to the left, upward or downward, or being moved in other ways.

Before providing a detailed description of the operations of architecture 100, a brief overview of the operation will be provided to enhance understanding. It is first assumed that user 110 is illustratively a farmer holding mobile device 104 and standing in a field or over another piece of agricultural terrain. User 110 first actuates mobile agricultural applications 160 which, themselves, enable the user 110 to view an agricultural item (such as some portion of the field, a plant, a weed, a pest, etc.) through viewing component 146 (such as through a camera lens). When user 110 is viewing a desired agricultural item (such as a piece of ground, a plant, a pest, etc.) user 110 illustratively actuates a user interface mechanism generated by mobile agricultural application 160 to indicate that the user wishes to obtain agricultural information from hosted service 112 about the viewed item (e.g., about the piece of ground being viewed, the plant, pest, etc.). In response, and when desired, various components of mobile device 104 calculate the position of that ground both globally, and relative to mobile device 104, to identify the particular ground being viewed through viewing component 146.

Application 160 then generates a request for desired data to hosted agricultural data service 112. Mobile application server 136 first determines whether the requested data is in the pre-indexed data store 138. If so, it simply provides that data back to mobile device 104. If not, it uses runtime search component 132 to search for, and obtain, the desired data. It then provides that data back to mobile application server 136.

In one embodiment, mobile agricultural application 160 uses various components of mobile device 104 to display the received data. For instance, it can generate a combined image of the data received from service 112 and the ground (or other agricultural item) being viewed through viewing component 146. In one embodiment, for instance, the data received from service 112 is indicative of a particular characteristic of the ground or plant or pest being viewed, and is used to generate an overlay image that is rendered as an overlay on the image being viewed through viewing component 146.

As one specific example, where the user (e.g., farmer) 110 is viewing a piece of ground in a field, the user 110 may request the location of the drain tiles in that field. In that case, mobile application server 136 returns data indicative of the drain tile location, relative to the piece of ground being viewed through viewing component 146. Mobile agricultural application 160 then generates the image, using the drain tile location information, to superimpose a visual indication of where the drain tiles reside, over the image of the piece of ground being viewed through viewing component 146. That is, an image of the drain tile is superimposed over the image of the ground to show the geographic correspondence between the location of the drain tile and the piece of ground. This is only one example, and other examples are discussed below.

Figure 2:
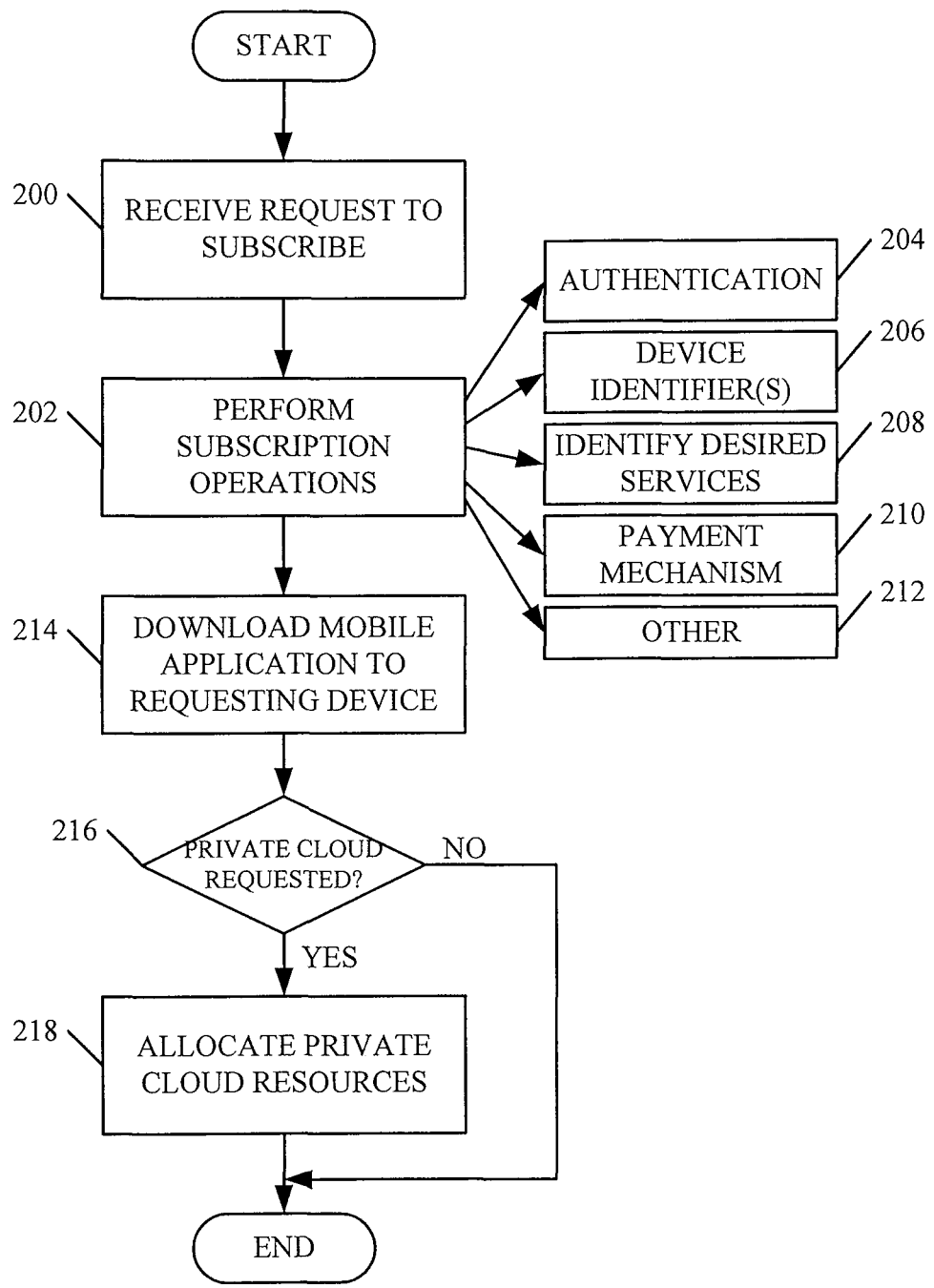
FIG. 2 is a flow diagram illustrating one embodiment of the operation of the architecture shown in FIG. 1 in allowing mobile devices to subscribe to a hosted data service.

FIG. 2 is a flow diagram illustrating one embodiment of the operation of architecture 100 in allowing a user 110 to subscribe to hosted agricultural data service 112. In one embodiment, subscription component 137 first receives a request from user 110 (such as through a mobile device, a desktop computer, a laptop computer, etc.) that the user wishes to subscribe to service 112. This is indicated by block 200 in FIG. 2.

Subscription component 137 then performs a variety of different subscription operations in order to have user 110 subscribe to the service. This is indicated by block 202. Such operations can include, for example, receiving authentication information 204 from user 110. Such authentication information can include account information, a password, a username, etc. The subscription operations can also include receiving device identification information that uniquely identifies device 104 and associates it with the user's subscription. This is indicated by block 206. The device identification information may also indicate whether device 104 is a smart phone, a tablet computer, or another device that has a different form factor for its display screen.

Subscription component 137 can also offer user 110 a variety of different subscription levels. For instance, it may be that user 110 can subscribe to obtain data from certain databases for one price, and subscribe to obtain other data, and additional services, for another price. Identifying the desired data and services that user 110 wishes to subscribe to is indicated by block 208 in FIG. 2.

Subscription operations 202 may also include identifying a payment mechanism that user 110 wishes to use to pay for the subscription (if they are sold). This is indicated by block 210 in FIG. 2. Of course, it will be noted that the subscription operations can include other operations as well, and this is indicated by block 212.

Once user 110 has successfully subscribed to service 112, mobile application server 136 illustratively downloads one or more mobile agricultural applications 160 that are run on mobile device 104 in order for user 110 to access service 112. Downloading the mobile applications is indicated by block 214 in FIG. 2.

In one embodiment, user 110 can elect to use hosted agricultural data service 112, to obtain data and services but maintain his or her data locally (such as on a mobile device 104 or the user's desktop or laptop, etc.). Alternatively, however, user 110 can illustratively elect to have his or her data stored on a private cloud data store 128, that is accessible only by user 110 or other authorized users. If the user elects to use the private cloud data store 128, then mobile application server 136 illustratively allocates private cloud resources in data store 128 for user 110. Having user 110 elect to use the private cloud data store 128, and allocating the resources, are indicated by blocks 216 and 218 in FIG. 2, respectively.

Figure 3:
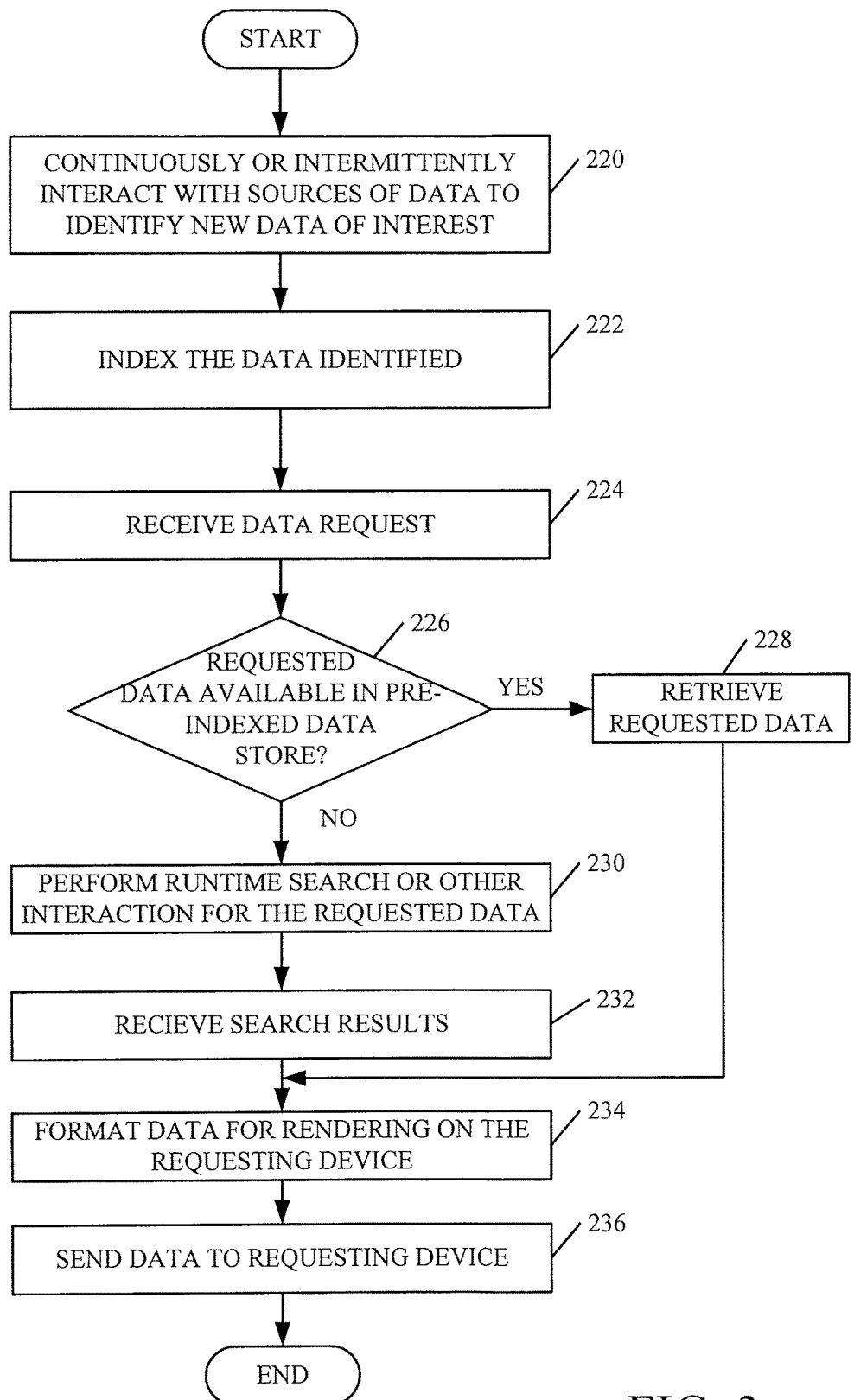
FIG. 3 is a flow diagram illustrating one embodiment of the operation of the architecture shown in FIG. 1 in providing data to a requesting mobile device.

After subscribing, user 110 can use service 112 to obtain data and services. FIG. 3 is a flow diagram illustrating one embodiment of the operation of hosted agricultural data service 112 in obtaining pre-indexed data for store 138, and in responding to data requests from a mobile device 104. In one embodiment, service 112 illustratively includes data obtaining component 130. Component 130 can be a crawler which continuously, or intermittently, crawls a variety of data sources to identify new data that might be of interest to various users 110. This data can illustratively be accessed by users 110, given their particular subscription. The data sources crawled by the crawler component may be data sources stored and serviced in cloud 102, such as data sources 114 or 116, or they can be data stores hosted at other websites, or otherwise accessible by component 130, through cloud 102. Such data stores are indicated by data stores 118, 120 and 122.

In another embodiment, component 130 is an upload component that receives data uploaded by the farmer (or other user), by crowd-sourced entities, or by other servers or data stores. Component 130 can obtain data in other was as well.

It will also be noted that component 130 can obtain data through a variety of services. For instance, a number of different services may be accessed to identify weed varieties, pest identities, seed information, or other information. In addition, various services provide weather information, soil type information, and a whole host of other information. Services can also be used to perform analysis on data that is collected and sent to those services. Different kinds of data are described in more detail below with respect to FIG. 4.

Hosted agricultural data service 112 can obtain information from services that are hosted in cloud 102 (such as services 124) or those that are hosted elsewhere, and accessible by service 112 (such as other services 126). Interacting with the data sources or data services to identify new data of interest is indicated by block 220 in FIG. 3.

Component 130 also illustratively includes an indexer. The indexer indexes the newly obtained data identified or obtained by component 130 and stores it in pre-indexed, geo-tagged data store 138. This is indicated by block 222. By way of example, where weather data is pre-indexed, the weather data will illustratively be specific to various different geographic locations. It is therefore tagged with the geographic information so that it can be retrieved based on geographic locations of interest. The same can be true for weed data, pest data, soil type data, and a wide variety of other types of data as well. The data can be indexed in many different ways.

At some point, mobile application server 136 illustratively receives a request for information from mobile device 104. Receiving a data request is indicated by block 224 in FIG. 3. As is described below, the data request will illustratively include a variety of information, such as the location of the image being viewed at mobile device 104, perhaps the image itself, and other information.

Mobile device application server 136 illustratively uses the information in the request to determine whether the requested data is available in the pre-indexed, geo-tagged data store 138. This is indicated by block 226. If so, server 136 simply retrieves the requested data from data store 138. This is indicated by block 228. If not, server 136 illustratively prepares a search request for runtime search component 132. Component 132 may be a browser, or a search engine, or another component that receives a query, as an input, and searches various websites, data stores, services, etc. to obtain relevant search results. Performing a runtime search for the requested data and receiving the search results is indicated by blocks 230 and 232 in FIG. 3. It will be appreciated that server 136 can search one or more caches for the requested data as well.

Also, server 136 may obtain the requested data in other ways as well. For instance, where the data is an image of a plant or pest and the requested data is to identify some attribute of the image (such as to identify the plant or pest or to determine whether the plant is as mature as it should be) the image may be sent to another entity for a response. For instance, an image of a pest may be sent to an agronomist for identification. An image of a plant may be sent to a seed company to identify whether the plant is healthy and whether it is maturing properly. These are examples only.

Also, in one embodiment, data generator 139 receives information (such as a request from the user or data from different services or external sites) and generates additional data. For instance, data generator 139 can get the location of the user, as well as information from a fertilizer company, and generate a suggested fertilizer application map that can be downloaded for use by the user, or that can be automatically downloaded to the user's fertilizer equipment and used by that equipment. This is just one example.

Regardless of how the requested data is obtained (whether from data store 138 or by running a search or otherwise) the data can be formatted for rendering on the particular requesting device 104. For instance, if the mobile device 104 is a smart phone, where the display real estate that can be used to generate a display is relatively small, the information may be formatted in one way. However, if the mobile device 104 is a tablet computer, with a larger display area, the data may be formatted in a different way. Formatting the data for rendering on the requesting device is indicated by block 234 in FIG. 3.

It should also be noted that formatting the data for proper rendering can be performed in a wide variety of different locations, and at a wide variety of different times. For instance, when data is stored in data store 138, it can be stored in different formats, so that it is readily accessible for returning (in proper format) to different types of mobile devices. That is, the same data can be stored in store 138 in a format that is suitable for rendering on a smart phone, and in another format that is suitable for rendering on a tablet computer, and in yet another format that is suitable for rendering on a laptop or desktop computer, etc. In the alternative, the data can simply be provided back to the particular requesting device 104, and that device 104 can be responsible for formatting the data for proper rendering on its own display screen. The formatting can be performed at other locations and at different times as well, and those discussed here are discussed for the sake of example only. In any case, the requested data is eventually sent back to the requesting mobile device 104. This is indicated by block 236 in FIG. 3.

Figure 4:
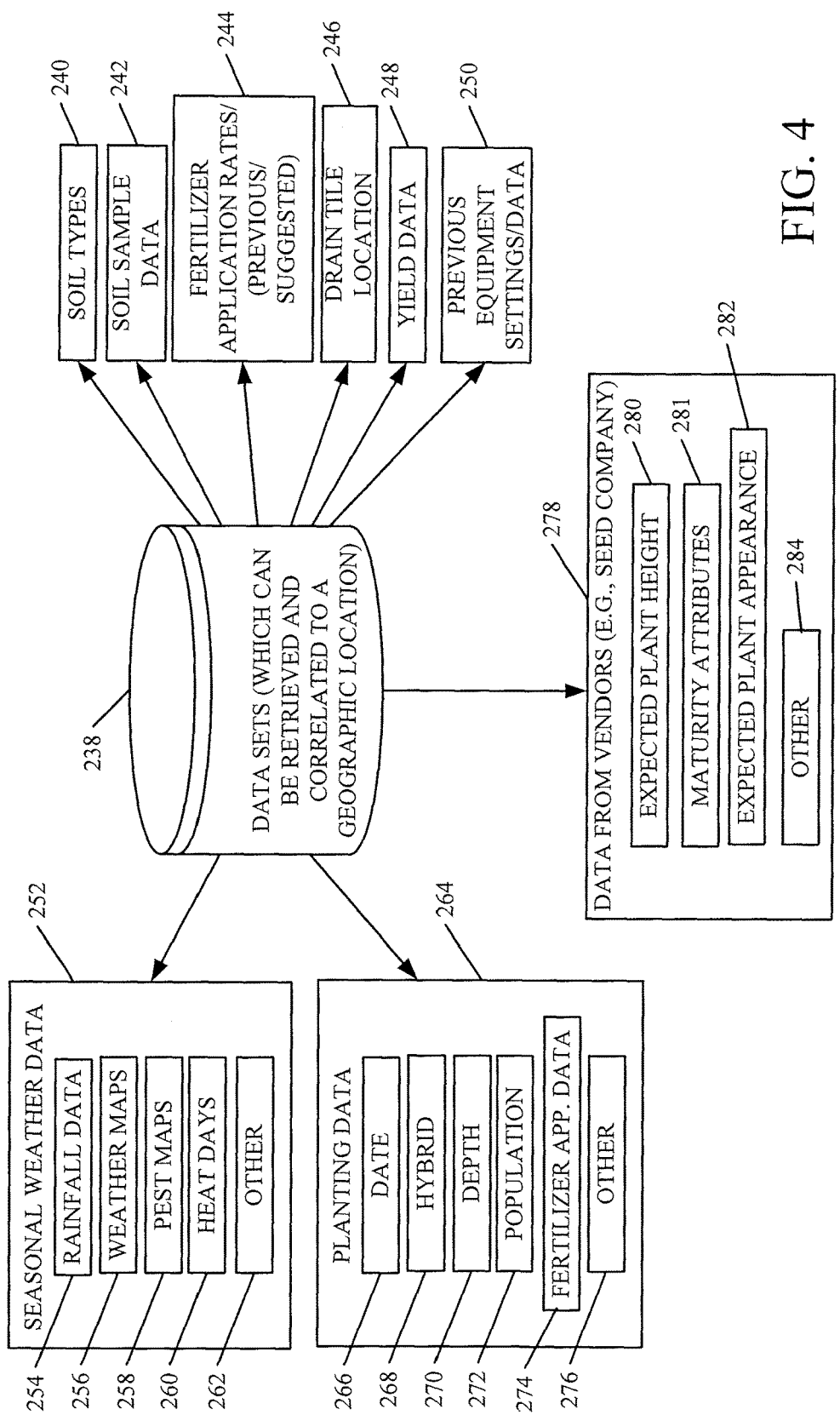
FIG. 4 is a block diagram illustrating one embodiment of some exemplary data sets that can be served by the hosted data service shown in FIG. 1.

Before describing the operation of mobile device 104 in more detail, some exemplary data sets will be described. FIG. 4 shows one embodiment of a number of different, exemplary, data sets that can be obtained by data obtaining component 130 and stored in pre-indexed, geo-tagged data store 138, or that can be retrieved during runtime by runtime search component 132 or by server 136 or other components in other ways (such as crowd sourcing, independent uploading, etc.). The data sets are indicated generally by number 238 in FIG. 4.

Some of the data sets can include soil types 240. By way of example, soil types can be analyzed and stored for a variety of different geographic locations. Some databases currently exist which already contain geographically indexed information that indicates the various soil types located in different locations. The soil types can include, for instance, clay, loam, sand, silt, peat, saline, etc. The soil types can be identified by their contents, by their pH and mineral levels, by their physical qualities (such as color and consistency), or in other ways as well.

Some data stores can also include soil sample data 242. By way of example, it may be that a farmer has already taken soil samples from various locations in the field of interest (the field being viewed). Those soil samples can be analyzed to determine a great deal of information about the individual sample of soil that has been taken. They are illustratively correlated to the geographic location from which they have been taken, and they can be stored for access by hosted agricultural data service 112.

The data sets 238 can also include fertilizer application data 244, such as the fertilizer application rates which have been previously used. They can also include fertilizer content and application rates that are suggested under the current conditions of the field being viewed by user 110.

The data sets 238 can also include drain tile location 246, historical yield data 248 and previous equipment settings or data about previous equipment that has been used to farm the field of interest, on previous occasions, as indicated by block 250. The previous equipment settings and equipment data can include a wide variety of different information. For instance, it can include last year's combine settings, the down force used by the seed drill in order to plant the seed, or a wide variety of other equipment settings and data.

Data sets 238 can also illustratively include seasonal weather data 252. The weather data can include rainfall data 254, weather maps 256, pest maps 258, heat days 260, and other weather information 262. By way of example, the pest maps 258 can include data indicative of common pests in the geographic region, pests that have been detected there, or other information. They can also include images of pests that can be used to identify pests that the farmer has found and other information.

Data sets 238 can include planting data 264. The planting data can include, for instance, the date 266 of previous plantings, the particular hybrid 268 that was planted, the depth 270, the population 272, the fertilizer application data 274 and a wide variety of other planting data 276.

Figure 4A:
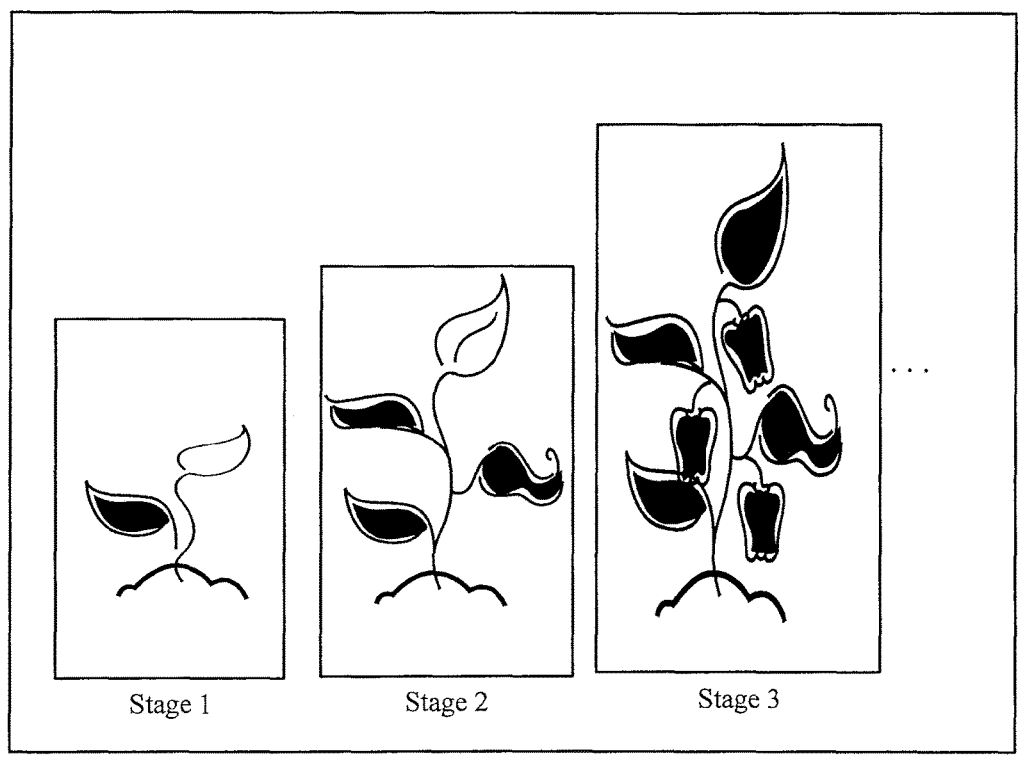
FIG. 4A is a block diagram of one illustrative data set.

In addition, data sets 238 can include data from vendors 278. The vendors can include a wide variety of different vendors, such as seed companies, fertilizer companies, equipment manufacturers, and other vendors. Where the vendor is the seed company, for instance, the data can include information that can be accessed to determine whether the crop is developing as expected, under the circumstances. By way of example, the seed company may take into account the location of the piece of ground being viewed by the farmer, the soil type, the weather data and fertilizer data for that piece of ground, and estimate the expected plant height 280 or other plant maturity attributes 281, under all relevant conditions. The data can also include expected plant appearance 282, and a wide variety of other data 284. As one example, maturity attributes 281 can include images of a given hybrid in various stages of growth. FIG. 4A, for instance, shows images of a particular plant in three different growth stages. The stages can correspond to different times after planting, considering different weather conditions, different soil types and all other relevant information corresponding to the location of the plant. A farmer may request data that shows what that particular plant should look like, given all the other data for the piece of ground that the farmer is viewing. The system can access a mapping between the growing conditions (e.g., weather, soil type, fertilizer history, etc.) and images of the plant at different maturity levels, and an image of the particular growth stage can be returned to the farmer based upon all the information. For instance, if the plant is a hybrid A and it is located in a given soil type, where the weather has often been cool and a first level of fertilizer has been applied, the image returned may be the stage 1 image. However, if the plant is hybrid A, but it is in a location with a different soil type, and where a second level of fertilizer has been applied, the returned image may be the stage 3 image. The same can be done for pest infestation. For instance, the farmer may send a request that has an image of a plant with certain characteristics indicative of a pest. The image can be compared to stored images of plants that have been affected by various pests to identify a similar image to the one submitted by the farmer. This can be used to indicate that the plant is being affected by the given pest, and that certain pesticides should be applied. These are examples only and others are described below. It will be noted that while the data from vendors 278 has been provided with respect to the vendor being a seed company, or a fertilizer company, the data will vary based upon the particular vendor. It can also come from universities, agronomists, or others.

Figure 5A:
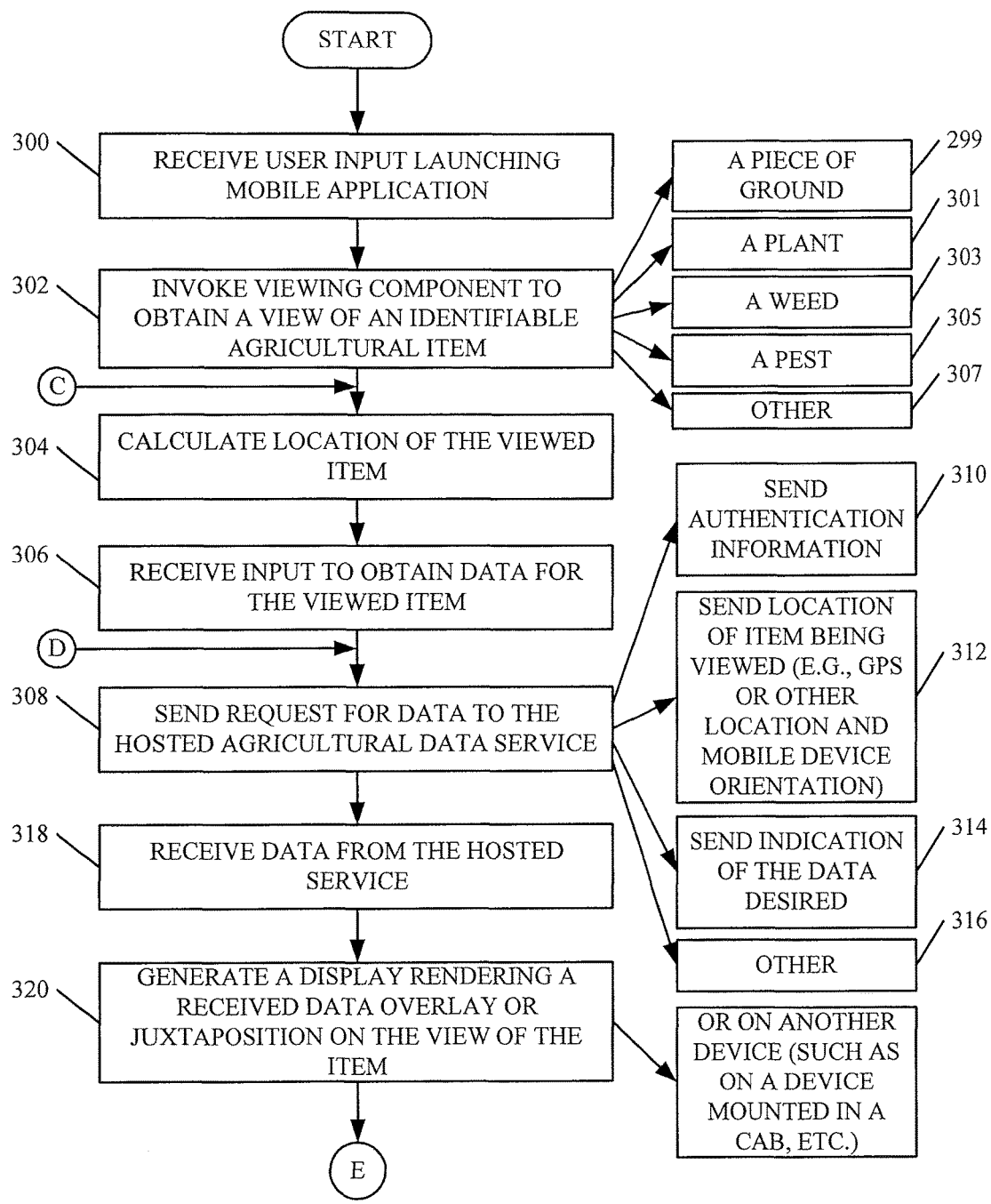
FIGS. 5A-5B (collectively FIG. 5) show a flow diagram of one embodiment of the mobile device shown in FIG. 1 in obtaining data and rendering a combined view.
Figure 5B:
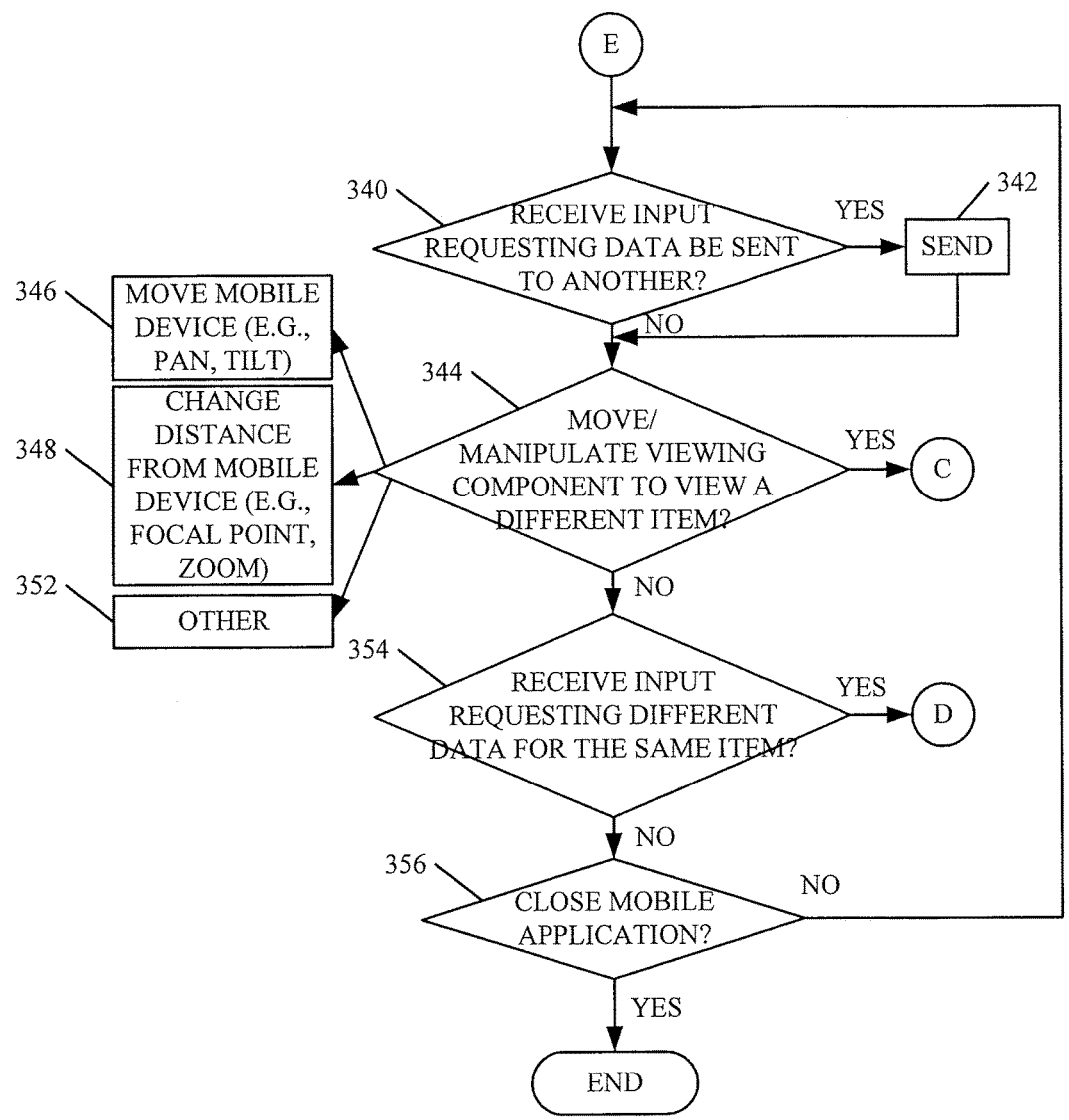

FIGS. 5A and 5B (collectively FIG. 5) show a flow diagram illustrating one embodiment of the overall operation of architecture 100 (and more specifically of mobile device 104) in generating a view of a piece of ground, and superimposing visual indicia over that view, based upon the data received from hosted agricultural data service 112. It will be noted that the generated view could also be a plant that the farmer is looking at, and the superimposed information can be an image of a plant as described above.

Mobile device 104 first receives an input from user 110 launching one or more of the mobile agricultural applications 160. This is indicated by block 300 in FIG. 5.

User 110 then provides inputs to invoke viewing component 146 to obtain a view of an identifiable agricultural item (such as piece of ground 209, a plant 301, weed 303, pest 305 or other item 309) near which the user 110 is standing. This is indicated by block 302. This may be done, for instance, by the user actuating the image capture functionality (e.g., the camera functionality) on mobile device 102. In that case, the view through the lens is illustratively displayed on a display device 152 (such as a display screen) on mobile device 104, so that user 110 can see the piece of ground (or plant) through the lens of the image capture component 162.

When the piece of ground (or plant or other image) is being viewed, application 160 illustratively controls distance calculation component 140 and positioning system 148 to calculate a location of the piece of ground being viewed. This is indicated by block 304. One embodiment of how this is done is described in greater detail below with respect to FIG. 6.

User 110 then provides a user input to mobile device 104 indicating that the user 110 wishes to obtain data for the piece of the ground (or plant or other image) that is being viewed. This is indicated by block 306. By way of example, it may be that application 160 provides a set of user input mechanisms that are displayed to user 110 on display device 152. The user input mechanisms can allow the user to navigate through menus or other user input mechanisms in order to select data that the user wishes to see. Application 160 can, for instance, display buttons or icons that correspond to drain tile data, weather data, planting data, plant image data, pest image data, or any of the various data sets described above with respect to FIG. 4. When the user actuates one of those user input mechanisms (such as with a touch gesture), application 160 generates a request for that data, along with the location of the piece of ground (or plant or pest, etc.) being viewed, and sends the request to the hosted agricultural data service 112. Sending the request is indicated by block 308 in FIG. 5.

The request, itself, can include a variety of different things. For instance, it can illustratively include authentication information that identifies user 110 to hosted agricultural data service 112. This is indicated by block 310. It can also include the location of the ground being viewed. This is indicated by block 312. The location can be identified using GPS coordinates, other location information (such as a location derived from a dead reckoning system, a cellular triangulation system, or a LORAN system), and it can also illustratively include the mobile device orientation. The request will also illustratively include an indication of the data that is being requested. This is indicated by block 314. It can include other information 316 as well.

Hosted agricultural data service 112 receives the request and obtains the requested data and sends it back to mobile device 104. Service 112 does this, for example, as described above with respect to FIG. 3.

Mobile device 104 then receives the requested data from hosted service 112. This is indicated by block 318 in FIG. 5. Application 160 then uses user interface component 158 to generate a display that renders an image indicative of the received data (received from hosted service 112) superimposed over the view of the piece of ground or plant or other image being viewed through viewing component 146. This is indicated by block 320 in FIG. 5. It will be noted that the view need not be superimposed but simply displayed in any way. It can also be displayed on a separate device (such as one mounted in the cab of a piece of agriculture equipment or otherwise) as indicated by block 512.

This can be done in a variety of different ways. For instance, the user interface component 158 can generate the image as a composite image, or as two separate images, one being overlaid over the other. It can generate the images in other ways as well. The actual rendering of the image can use the inputs from the various sensors and components on mobile device 104 to accurately render a depiction of the image indicative of the received data being overlaid or superimposed over the image being viewed.

By way of example, the orientation sensing system 150 can sense whether the mobile device 104 is being tilted downward or upward, or to the right or to the left. Motion sensors 160 can determine whether the device is being moved (such as panned to the left or to the right, or otherwise). Distance calculation component 140 can identify the focal point of the image capture component (such as the focal point of the camera lens) to determine how far the piece of ground is from mobile device 104 (and hence user 110). This can be used to provide a perspective for rendering the superimposed data.

Taking the drain tile example, application 160 uses the various components of mobile device 104 to accurately superimpose the location of the drain tiles over the view of the ground being displayed to user 110. It will illustratively do so using proper perspective, so that the visual indicia indicating where the drain tile resides on that ground will be accurately located with respect to the image being displayed. Taking the plant image example, application 160 illustratively displays the image of the plant received from service 112 over the top of, side-by-side with, or otherwise juxtaposed to the image of the plant being viewed.

Figure 5C:
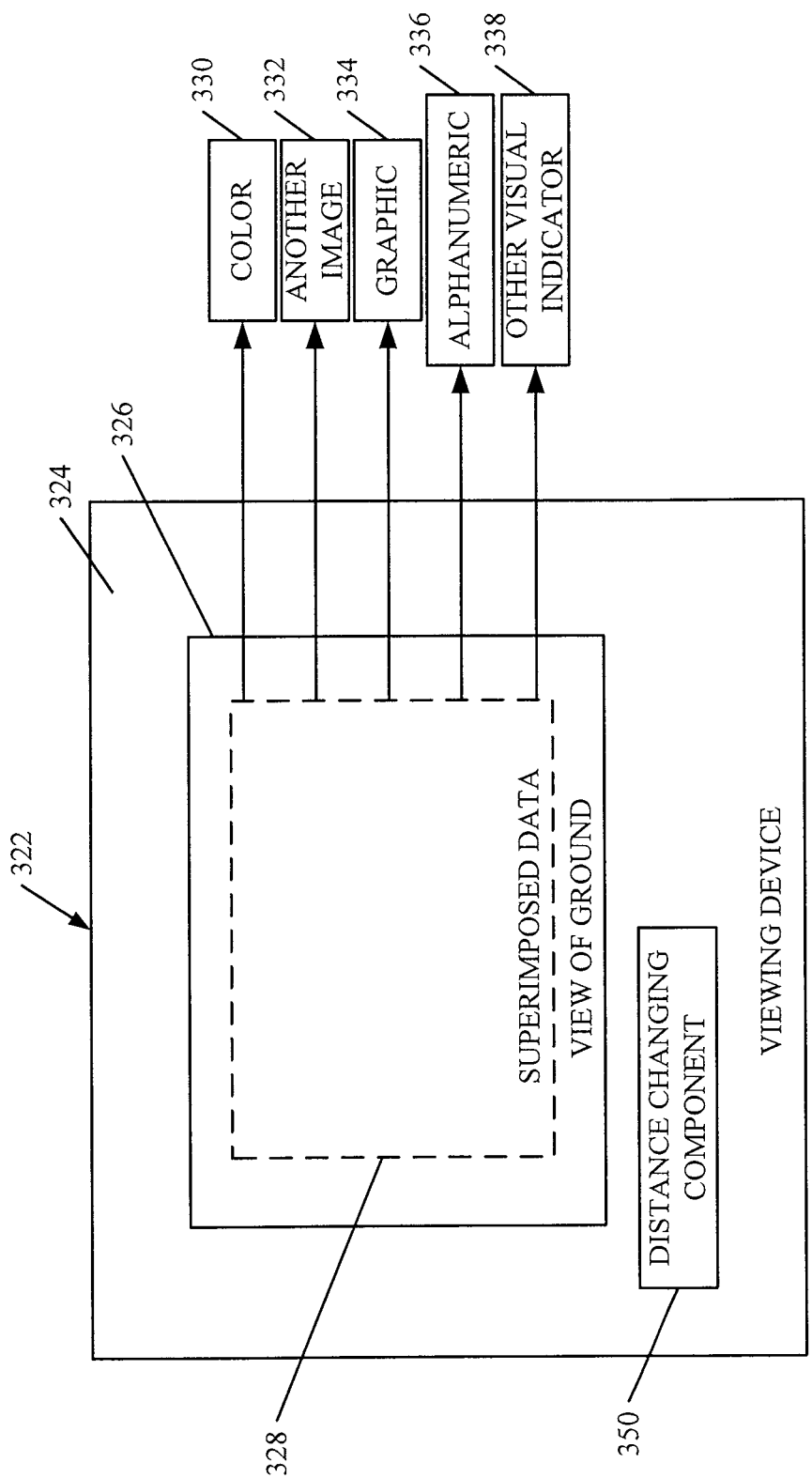
FIG. 5C is a block diagram of one illustrative combined view.

FIG. 5C is a block diagram of one illustrative user interface display 322. In the embodiment shown in FIG. 5C, user interface display 322 is shown on a viewing device 324. Viewing device 324 may illustratively be an LCD display (or other display device) that displays the view from a camera lens or other image capturing component 162 on mobile device 104. The image illustratively includes a view of the ground 326 that is being viewed through the viewing device 324, along with a visual indication showing an image indicative of the data received from service 112 superimposed or otherwise displayed on the view of the ground 326. The superimposed data is indicated by 328 in FIG. 5C.

Figure 5D:
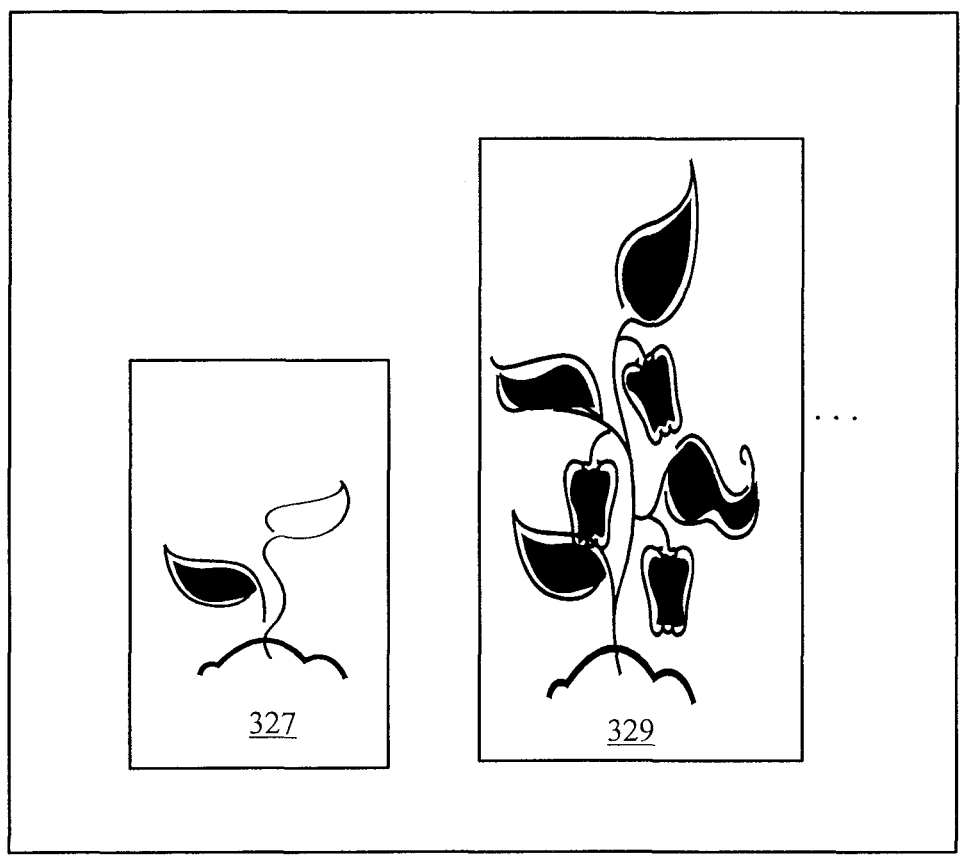
FIG. 5D is one illustrative set of images.

FIG. 5D shows another embodiment. In FIG. 5D an image 327 of a plant being viewed by the user is shown in juxtaposed relation to an image 329 received from service 112. Image 329, for example, shows an image of a plant, as the seed vendor or agronomist believes it should look, given all the information for the location of the plant. If the two are not the same, the user can also request suggestions, such as different fertilizer rates, pesticides, etc.

The superimposed (or juxtaposed) data can be displayed in a wide variety of different ways. For instance, it can simply be used to shade view 326 in varying colors 330, based upon the particular data being displayed. By way of example, if the data being displayed over the view of the ground is soil type, then different colors can be used to indicate different soil types that are located on the ground being viewed. Of course, colors can be used to indicate other things as well, such as estimated soil moisture, the fertilizer application rates that have been used (or that are suggested) at the various locations, the types of pests or weeds that have been identified or that are expected on that piece of ground, etc.

The superimposed data can be generated in the form of another image 332 as well. For instance, the drain tile location (or plant growth stage) can be represented by a dashed line or another image that resembles an actual drain tile (or plant). The superimposed data 328 can be shown as a computer generated graphic 334, or as alphanumeric information 336. For instance, the alphanumeric information 336 can be a numeric indicator identifying a planting depth as it varies across the ground being viewed. The alphanumeric information 336 can be used to indicate many other things as well. Of course, the superimposed data 328 can be comprised of other visual indicators 338 as well.

At any time while user 110 is viewing the view of the ground along with the superimposed data, user 110 can provide an input requesting that information representing the view and superimposed data be sent to another person or sent off to storage. This is indicated by block 340 in the flow diagram of FIG. 5. For example, user 110 can indicate that the combined image be e-mailed to an agronomist, the seed company, or anyone else. When this is done, application 160 illustratively interacts with communication component 166 to send the image, as desired. This is indicated by block 342.

User 110 can also illustratively move mobile device 104 to change the view of the ground (or plant) in the generated image. This is indicated by block 344 in FIG. 5. By way of example, user 110 can move the mobile device by panning it to the right or left or tilting it upwardly or downwardly in order to view a different piece of ground. This is indicated by block 346.

Also, user 110 can change the distance from mobile device 104, of the piece of ground being viewed. This is indicated by block 348. In order to do this, user 110 can illustratively change the focal point of the image capture component 162 that is being used to generate the image. For instance, when the image includes a piece of ground that extends from approximately ten feet away from the mobile device to approximately forty feet away from the mobile device, the user can illustratively touch the touch sensitive display screen on a portion of the image to shift the focal point of the camera to the touched location. This can have the effect of moving the location of the ground being viewed from a place closer to the user to a point further distant from the user, or vice versa.

In another embodiment, application 160 displays a distance slider on the display screen that can be manipulated by user 110 using touch gestures (or otherwise) to indicate a distance from mobile device 104, for which data is being sought. For instance, it may be that data is being sought for the piece of ground closely adjacent user 110. The user 110 may then wish to retrieve data for a piece of ground further away. The user 110 can actuate the slider to indicate that he or she wishes to retrieve data for a piece of ground an ⅛ of a mile away from the user, etc. These measurements are given for the sake of example only. Distance changing component 350 is shown on the user interface display of FIG. 5C to represent the slider, or other touch sensitive distance changing mechanisms that can be used to change the distance. Of course, they can be manipulated using a joystick, a thumbswitch, or other mechanism other than touch gestures.

Referring again to the flow diagram of FIG. 5, user 110 can move or manipulate the viewing component in other ways as well. For instance, the user can simply walk through the field so that the image of the ground or plants being viewed changes. Moving the viewing component in other ways is indicated by block 352 in FIG. 5.

While user 110 is viewing a piece of ground or plants, user 110 can also provide an input requesting different data for the same piece of ground or plants. This is indicated by block 354 in FIG. 5. For instance, the user 110 may first request that the drain tile data be superimposed over the image of the ground. User 110 may next request that the fertilizer application rate data be superimposed over the ground. User 110 may then request that soil type data be superimposed over the image of the ground. User 110 may then request that an expected plant maturity image be displayed. All of these images can be accumulated to generate a view of the ground with multiple sets of data superimposed over it, or each set of superimposed data can be erased when a new one is requested. In any case, when the new information is requested at block 354 in FIG. 5, processing reverts to block 308 where a request for the new data is sent from mobile device 104 to hosted agricultural data service 112.

It should also be noted that, at any point, user 110 can provide a user input to close the mobile agricultural application 160. This is indicated by block 356 in FIG. 5. When that happens, the application is simply closed.

Another feature should also be mentioned. At any point when the user is viewing the information, the user can provide a user input to save that information to the user's stored agricultural data. If the user is using private cloud store 128, then when the storage input is received from the user, application 160 provides the information to mobile application server 136 in hosted data service 112 for storage in the user's private cloud store 128. If the user is storing the information locally, or on a different store, then application 160 sends the information for storage at that location.

The information is illustratively stored along with a time stamp so that it can be retrieved later, at any point in time. This allows user 110 or another service to perform historical analysis with respect to the captured image and superimposed data.

Figure 6:
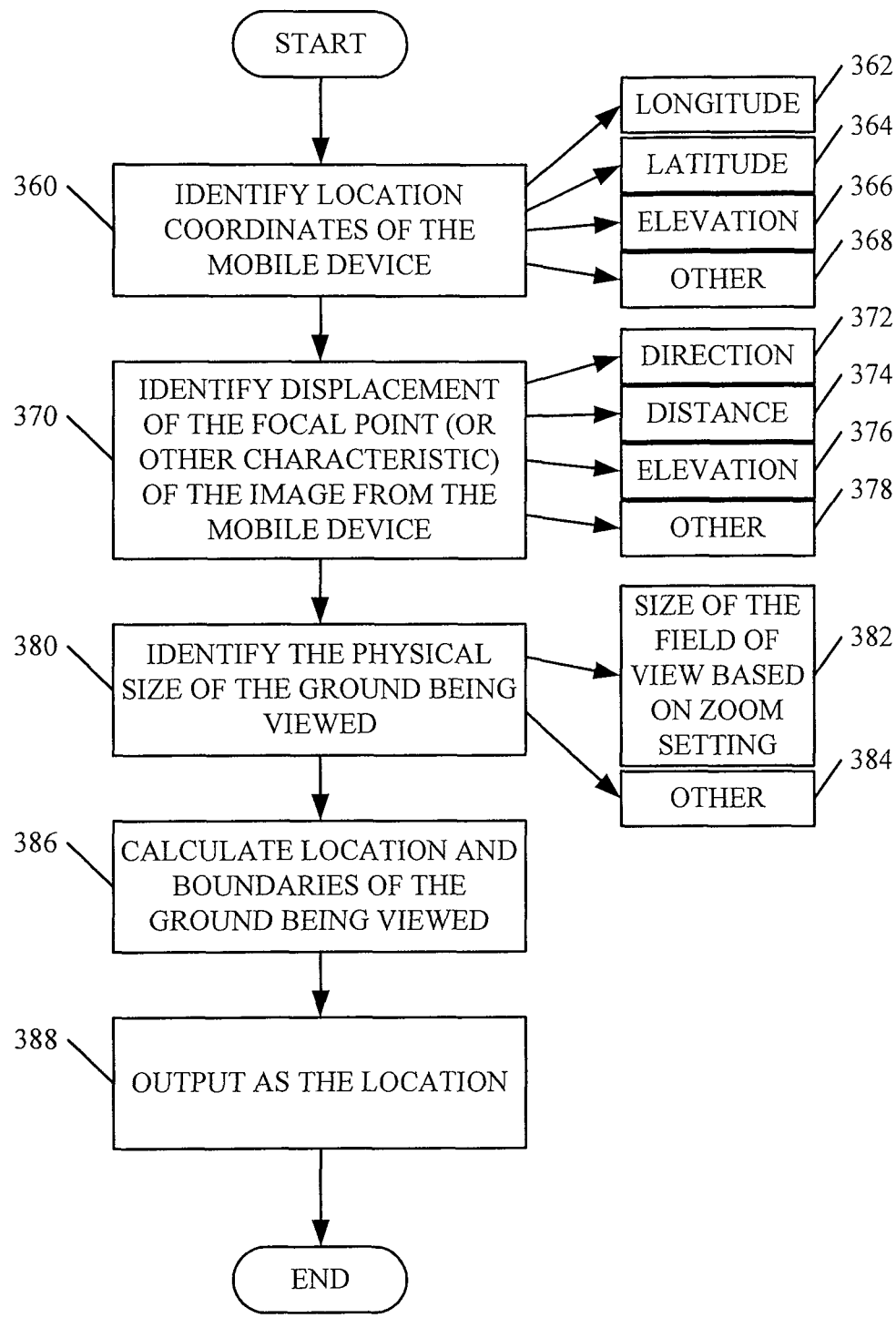
FIG. 6 is a flow diagram illustrating one embodiment of the operation of the architecture shown in FIG. 1 in calculating a location of the ground being viewed.

FIG. 6 shows one embodiment of the operation of distance calculation component 140 which can be used by application 160 in order to obtain a measure of the position of the piece of ground being viewed, and to generate an image that shows it in perspective, relative to the position and orientation of mobile device 104. It will be noted that this can be done in a wide variety of different ways and that described with respect to FIG. 6 is only one example.

Application 160 illustratively identifies the location coordinates of mobile device 104 using positioning system 148. This is indicated by block 360 in FIG. 6. The location coordinates illustratively include a longitude 362, a latitude 364, an elevation 366, and it can include other information as well, as indicated by block 368. The location coordinates can be obtained using a variety of different positioning systems. For instance, they can be obtained using a global positioning system (GPS), using a long range aide to navigation (LORAN) system, using any of a variety of dead reckoning systems, using a cellular tower triangulation system, or using other systems.

Once the location of mobile device 104 is identified, application 160 uses distance calculation component 140 to identify a displacement of the focal point (or the ground being viewed as identified by another characteristic) from mobile device 104. This is indicated by block 370 in FIG. 6. In one embodiment, the distance is characterized in terms of its direction from mobile device 104, as indicated by block 372. It is also characterized by the distance 374 from mobile device 104, any change in elevation (such as if the user is pointing the camera in mobile device 104 slightly upwardly or downwardly to accommodate terrain, etc.) as indicated by block 376, and the displacement can be calculated using other information 378 as well.

Application 160 also illustratively identifies the physical size of the ground being viewed. This can illustratively be determined based upon the zoom setting of the view finder (or camera) being used to generate the view of the ground. By way of example, if the zoom setting is set on 1×, then the size of the ground being viewed can be calculated as a first size. If the zoom setting is set on 5×, then the size of the ground can be calculated as a different size. Calculating the physical size of the ground being viewed can be performed in other ways as well, as indicated by block 384. Identifying the physical size is indicated by block 380. Identifying the size of the field of view based on the zoom setting is indicated by block 382.

Once all of this information is received, distance calculation component 140 illustratively calculates the location and boundaries of the ground being viewed in the displayed image. This is indicated by block 386 in FIG. 6. All of this information, or a subset of it, can be output as the location of the ground being viewed. This is indicated by block 388. Again, it will be noted that the particular location, boundaries and orientation of the ground being viewed can be calculated in other ways as well, and the description with respect to FIG. 6 is only one example.

Figure 7:
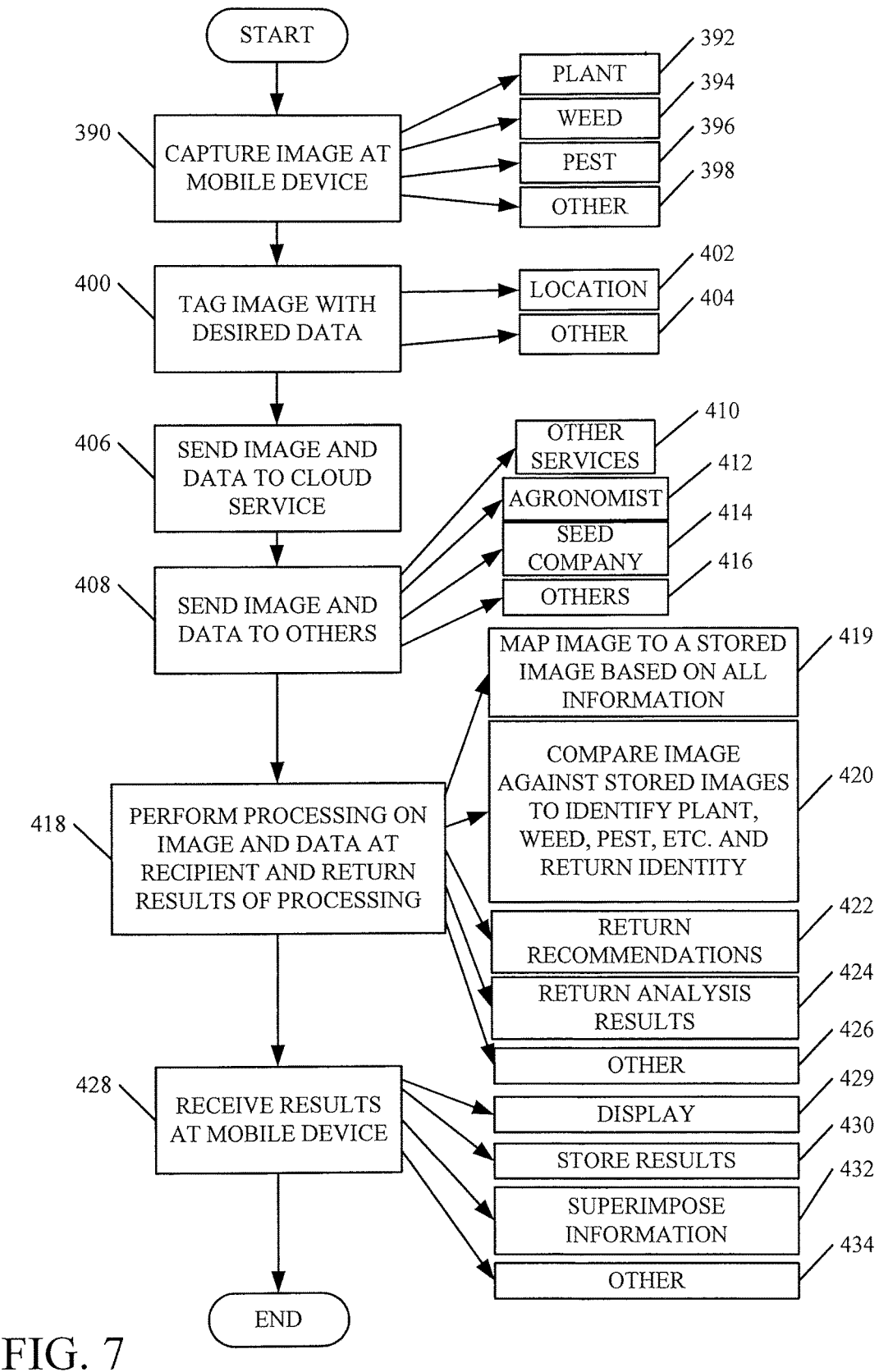
FIG. 7 is a flow diagram illustrating one embodiment of the operation of the mobile device shown in FIG. 1 in capturing an image and sending it to the cloud-based service to obtain analysis results.

User 110 can also use mobile device 104 to capture images or other data and send it to service 112 for storage or analysis. FIG. 7 is a flow diagram illustrating one embodiment of the operation of mobile device 104 in capturing data (such as an image or other data) and sending it to hosted agricultural data service 112 for analysis, or storage. In the example shown in FIG. 7, user 110 first uses image capture component 162 to capture an image at mobile device 104. This is indicated by block 390 in FIG. 7. The image can be of the ground (as discussed above) or it can be an image of a plant 392, a weed 394, a pest 396, or other information 398.

Application 160 illustratively tags the image with desired data. This is indicated by block 400 in FIG. 7. By way of example, the image can be tagged with time, date and location information as indicated by block 402. Or it can be tagged with other information as indicated by block 404.

The image and added data (if any) are then sent to hosted agricultural data service 112 in cloud 102. This is indicated by block 406 in FIG. 7.

As discussed above, user 110 can illustratively request that the information be sent on to others. If so, it can be sent directly by mobile device 104 using communication component 166, or it can be sent by hosted agricultural data service 112. Sending the image and data on to others is indicated by block 408 in FIG. 7. Sending it to other services 124 or 126 is indicated by block 410. It can also be sent to an agronomist 412, to the seed company 414 (or other vendors) or to other people 416 as well.

Hosted agricultural data service 112 can then perform processing on the image and data that it has received. Also, any other recipient of the information can perform processing and return results of that processing. This is indicated by block 418. This can take a wide variety of different forms. For instance, in one embodiment, user 110 captures an image of a plant, and appends the location of that plant. The image and location are then sent to a seed company or an agronomist which compares the stored image against an image that shows the expected maturity of the plant (as shown above in FIG. 4A), at that location, given the hybrid, the weather data, soil type information, fertilizer information, and other information that has been appended to the image. The seed company can then illustratively send back a comparison image showing the expected maturity of the plant (e.g., what the plant should look like under these circumstances as shown in FIG. 5D) and superimposed over the image of the actual plant that was sent by user 110. The seed company can also send back recommendations (such as to increase or decrease fertilizer application, etc.).

The image can also be automatically mapped to other stored images. For instance, if the image is a plant, the service returning the data can take the location of the plant, the weather data and soil data for that location, the fertilizer and tillage history, the particular hybrid, and map to an image of the plant at an expected maturity, given all of the information. Mapping the data against stored images is indicated by block 419. The image can also be automatically compared against libraries of other images or examined by consultants for purposes of identification. For instance, where user 110 captures an image of a weed, it can be viewed by a consultant or compared against other images at a weed identification service, to identify the weed and send the weed identification back to user 110. The same can be done for various pests and other information. Comparing the image against stored images and returning the results is indicated by block 420 in FIG. 7.

The recipient that receives the information can also return recommendations for how to proceed. This is indicated by block 422. For instance, if the image is a pest, the recommendations may include pesticides to apply. If the image is a diseased plant, the recommendations may include treatment options for treating the disease. These are examples only. The recipient can return analysis results of various kinds, and this is indicated by block 424. Of course, the recipient can return other information as well, and this is indicated by block 426.

Mobile device 104 receives the results and can perform a variety of different actions. Receiving the results is indicated by block 428 in FIG. 7. Mobile agricultural application 160 can simply store the results, as directed by user 110. This is indicated by block 430. Again, the results can be stored locally, at a variety of different locations, or in private cloud store 128. Mobile device 104 can generate the superimposed or juxtaposed image and superimpose or juxtapose the information received over the image being viewed as discussed above. This is indicated by block 432. Of course, mobile device 104 can perform other operations as well, and this is indicated by block 434.

Figure 8:
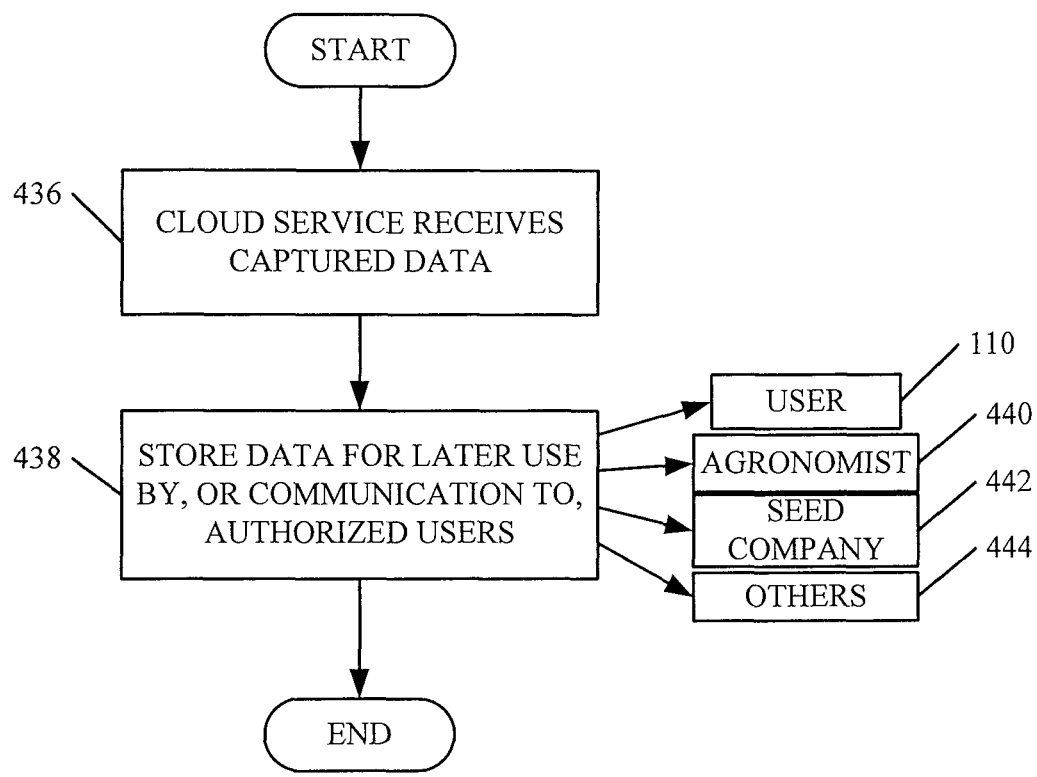
FIG. 8 is a flow diagram illustrating one embodiment of the operation of the architecture shown in FIG. 1 in receiving captured data at the cloud-based service.

FIG. 8 is a flow diagram illustrating one embodiment of the operation of hosted agricultural data service 112, when it receives information from mobile device 104. Service 112 first receives the captured data (the image along with any appended data) from mobile device 104. This is indicated by block 436 in FIG. 8.

Service 112 then stores the data for later use by, or communication to, other authorized users. This is indicated by block 438 in FIG. 8. By way of example, the information can be stored for later access by user 110. It can also be stored for later access or analysis by an agronomist identified by user 110. This is indicated by block 440 in FIG. 8. It can be stored for sending to a vendor, such as the seed company, the fertilizer company, etc., as indicated by block 442. It can also be stored or sent to other services or data stores or entities as well. This is indicated by block 444.

It can thus be seen that the present system allows the farmer to obtain information throughout an entire year that will assist in making the many decisions that need to be made for a successful harvest. In the pre-planting season, the farmer can obtain information that will assist in deciding what crop to plant and in making tillage and fertilizer decisions. During the growing season, it provides information about expected plant maturity, weed and pest information and images that show all this as well as certain diseased plants, for comparison to the growing plant. Post harvest, the information can assist the farmer in analyzing performance and modifying the decisions made earlier on to improve the next year. These are examples only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
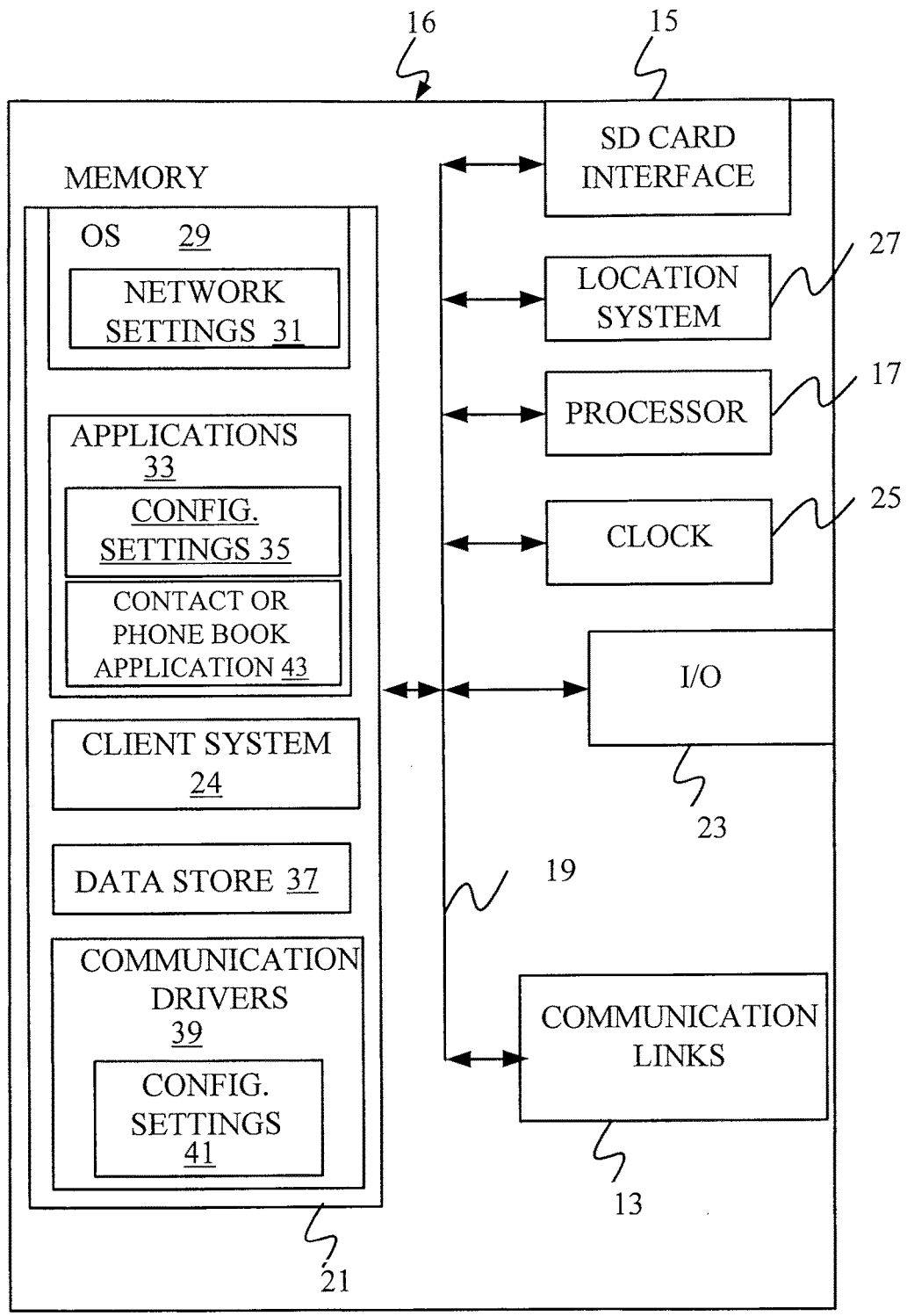
FIGS. 9-13 show various embodiments of mobile devices.

FIG. 9 is a simplified block diagram of one illustrative embodiment of a handheld or mobile computing device 16 that can be used as a user's or client's mobile device 104, in which the present system (or parts of it) can be deployed. It should be noted that device 16 can be hand held, mounted in a cab of a piece of agricultural equipment, or in other places as well. It can be a relatively small device (when it is hand held, for instance) or larger (when it is mounted in a cab, for instance) FIGS. 10-13 are examples of handheld or mobile devices.

FIG. 9 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication through one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like mobile agricultural application 160) are received on a removable Secure Digital (SD) card that is connected to a SD card interface 15. SD card interface 15 and communication links 13 communicate with a processor 17 (which can also embody processors 154 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts of the functionality in service 112 or mobile device 104. Processor 17 can be activated by other components to facilitate their functionality as well.

Examples of the settings 31 include things such as proxy information, Internet connection information, and mappings. Settings 35 include settings that tailor the application for a specific user. Settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 10:
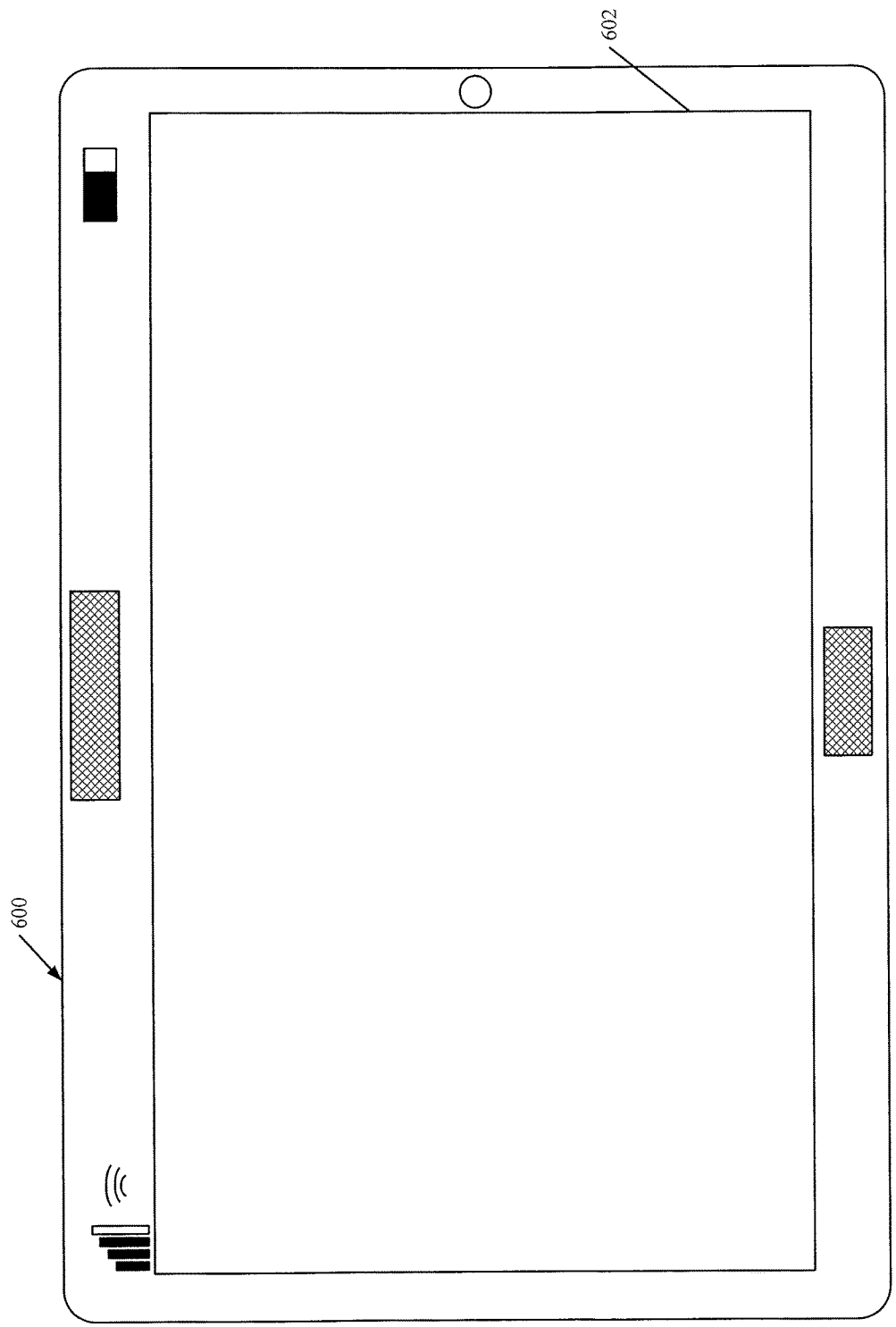

FIG. 10 shows one embodiment in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 11:
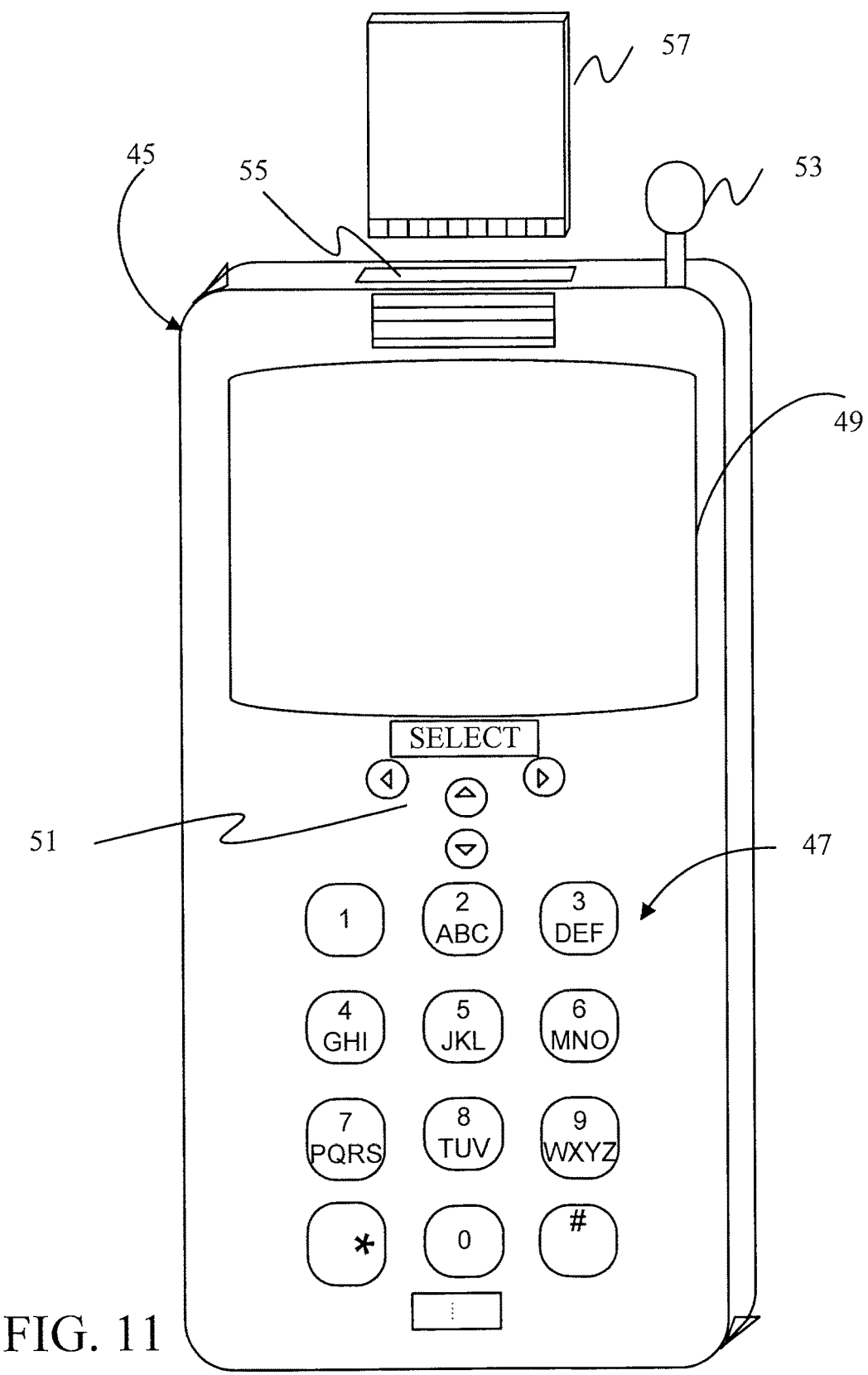
Figure 12:
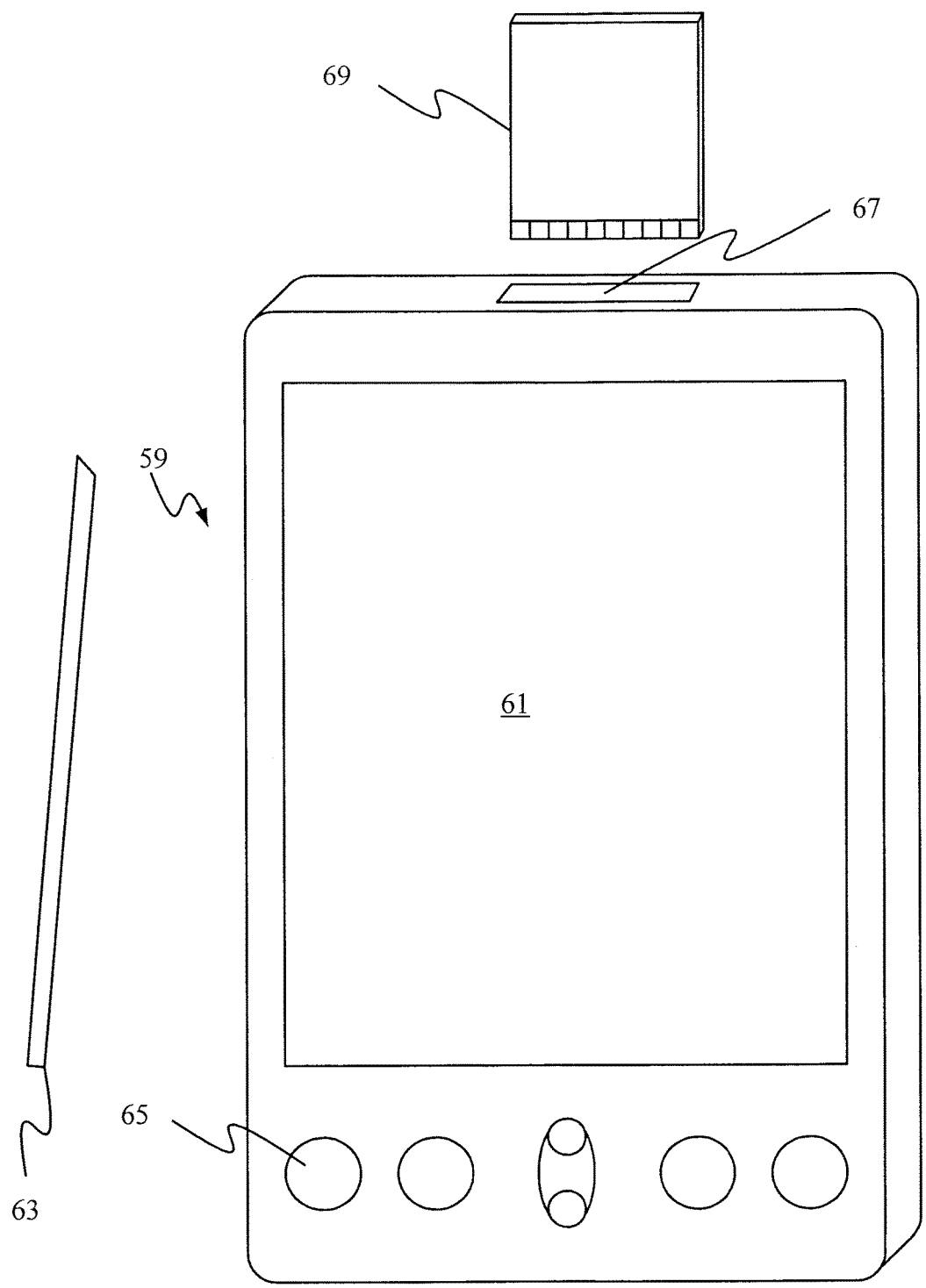

FIGS. 11 and 12 provide additional examples of devices 16 that can be used, although others can be used as well. In FIG. 11, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals.

The mobile device of FIG. 12 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections can be made through a cradle that connects to the other computer through a serial or USB port. As such, these connections are non-network connections.

Figure 13:
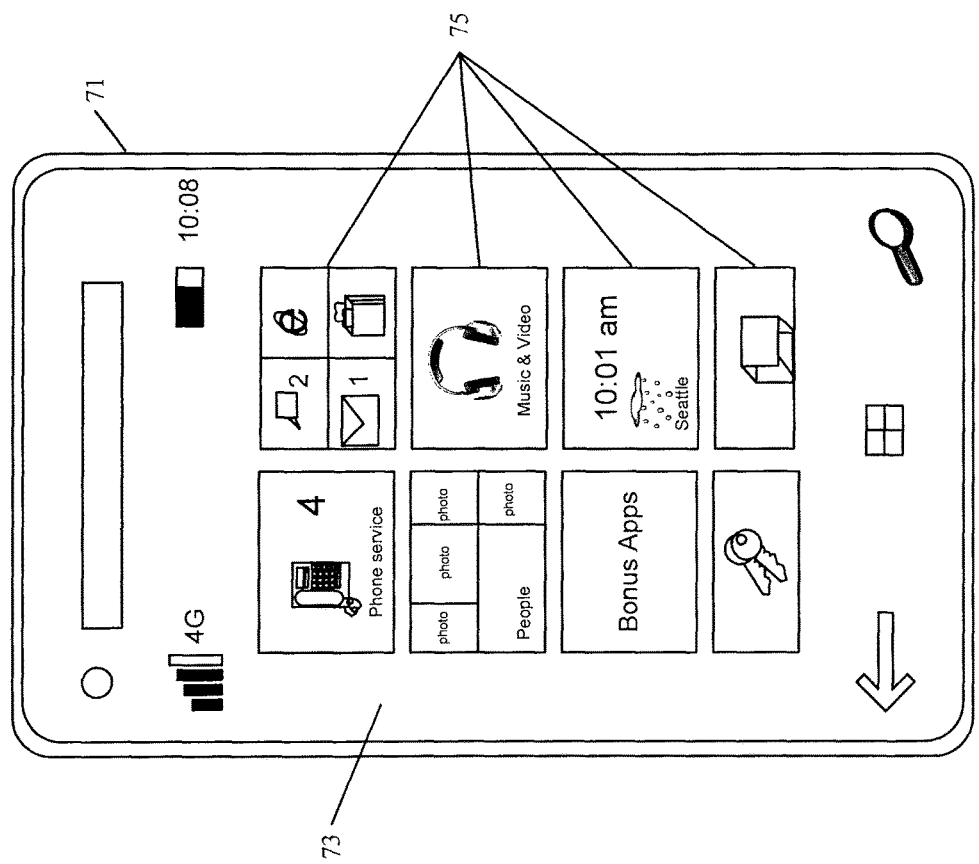

FIG. 13 is similar to FIG. 11 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
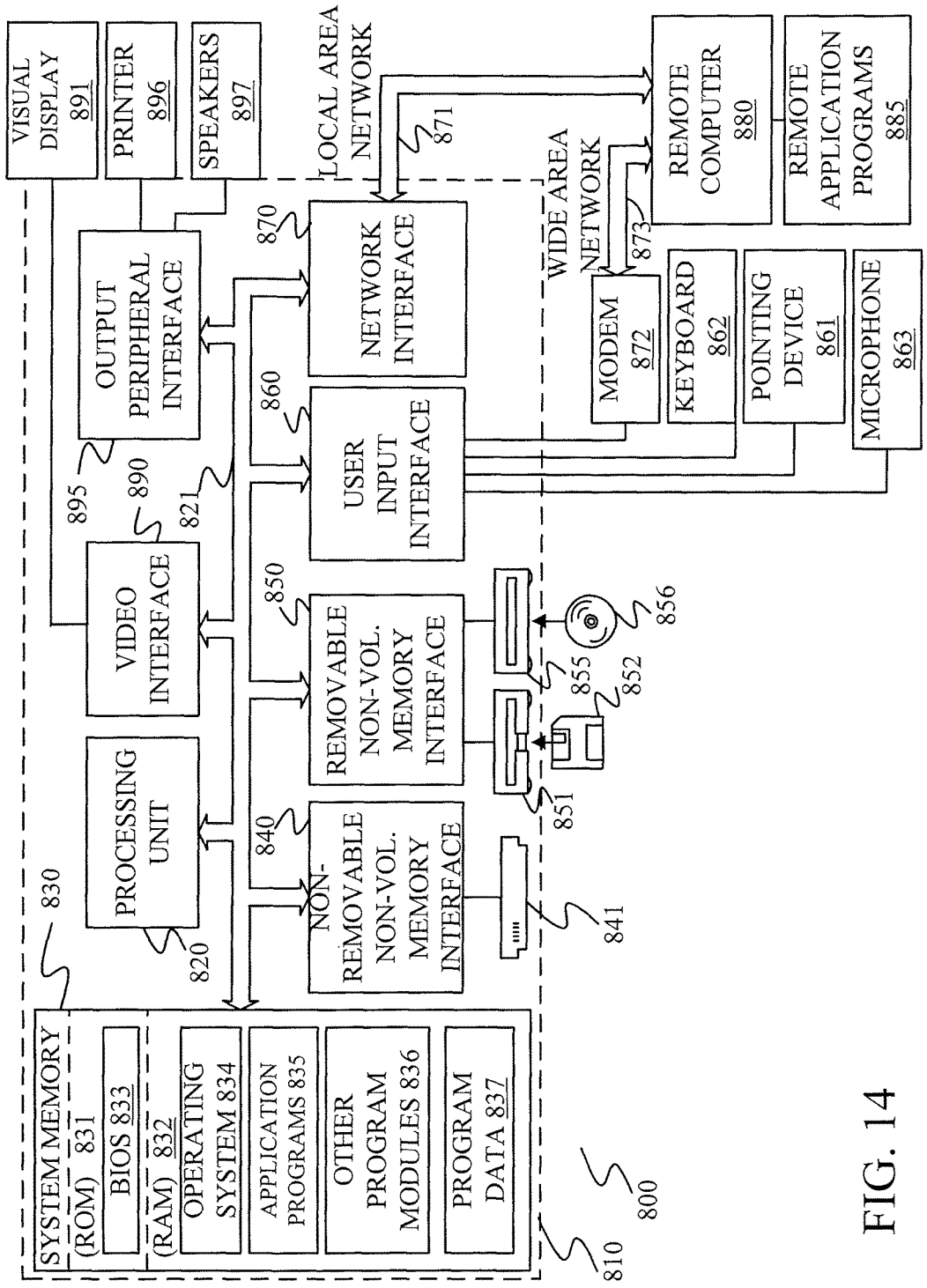
FIG. 14 is a block diagram of one illustrative computing environment.

FIG. 14 is one embodiment of a computing environment in which architecture 100, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 134, 154 or server 136), a system memory 830, and a system bus 821 that couples various system components including the system memory to the processing unit 820. The system bus 821 may be any of several types of bus structures using any of a variety of bus architectures. Such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Memory and programs described with respect to FIG. 1 can be deployed in corresponding portions of FIG. 14.

Computer 810 typically includes a variety of computer readable media. Computer readable media can be any media (or a combination of media) that can be accessed by computer 810 and includes both volatile and nonvolatile media. The media can be removable or non-removable media. By way of example, and not limitation, computer readable media may comprise computer readable storage media and communication media. Computer readable storage media is different from, and does not include, a modulated data signal or carrier wave. It includes hardware storage media including both volatile and nonvolatile, removable and non-removable media implemented by any method or in any technology for storage of information such as computer readable instructions, data structures, program modules or other data. For instance, computer storage media includes, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can be accessed by computer 810. Communication media comprises computer readable instructions, data structures, program modules or other data in any information delivery media. The term "modulated data signal" means a signal that has one or more of its characteristics set or changed in such a manner as to encode information in the signal. By way of example, communication media includes wired network or direct-wired connection, and wireless media such as acoustic, RF, infrared and other wireless media.

The system memory 830 can include computer storage media in the form of read only memory (ROM) 831 and random access memory (RAM) 832. A basic input/output system 833 (BIOS), containing the basic routines that help to transfer information between elements within computer 810, such as during start-up, is normally stored in ROM 831. RAM 832 can store data and/or program modules that are immediately accessible to or are being operated on by processing unit 820, like operating system 834, applications 835, other program modules 836 and other data 837.

The computer 810 may also include other computer storage media. FIG. 14 shows a hard disk drive 841 that reads from or writes to magnetic media, a magnetic disk drive 851 that reads from or writes to a removable, magnetic disk 852, and an optical disk drive 855 that reads from or writes to a removable, optical disk 856 such as a CD ROM or other optical media. The hard disk drive 841 can be connected to the system bus 821 through a memory interface such as interface 840, and magnetic disk drive 851 and optical disk drive 855 can be connected to the system bus 821 by a memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 14 include a local area network (LAN) 871 and a wide area network (WAN) 873, but may also include other networks.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. For instance, FIG. 14 illustrates remote application programs 885 as residing on remote computer 880. It will be appreciated that the network connections shown are exemplary.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for displaying agricultural data on a mobile device, comprising:

displaying, on a display of the mobile device, a real-time feed of an agricultural item, wherein the agricultural item is a piece of ground currently visible to a user of the mobile device through a viewing component of the mobile device;

detecting actuation of a user interface mechanism, generated by an agricultural application on the mobile device, indicating a request for agricultural data corresponding to a drain tile location for the piece of ground currently visible through the viewing component;

in response to the actuation of the user interface mechanism, determining a position of the piece of ground both globally and relative to the mobile device using both a distance calculation component and positioning system of the mobile device while the real-time feed of the piece of ground is being displayed;

initiating, utilizing a communication component of the mobile device, the request for agricultural data corresponding to the drain tile location for the piece of ground;

receiving from a remote source, using a processing component of the mobile device, the requested agricultural data corresponding to the drain tile location, as well as an indication of how the drain tile location corresponds geographically to the piece of ground based on the position of the piece of ground; and while maintaining the real-time feed of the agricultural environment, displaying, on the display, visual indicia indicative of the received agricultural data by superimposing the visual indicia of the drain tile location over the real-time image of the piece of ground based on the geographic correspondence of the received agricultural data corresponding to the drain tile location to the piece of ground.

2. The computer-implemented method of claim 1, further comprising:

manipulating the mobile device to display a real-time image of a different agricultural item that is visible using the viewing component of the mobile device; and repeating the steps of receiving agricultural data and superimposing visual indicia over the real-time image of the different agricultural item based on the geographic correspondence of the received agricultural data to the different agricultural item.

3. The computer-implemented method of claim 1 further comprising:

prior to receiving the agricultural data, initiating the request for a set of agricultural data, geographically corresponding to the piece of ground, to the data service.

4. The computer-implemented method of claim 3 wherein initiating the request for the set of agricultural data comprises:

sending the determined position of the piece of ground; and sending a data identifier identifying the set of agricultural data requested.

5. The computer-implemented method of claim 4 further comprising:

prior to initiating the request for the set of agricultural data determining the the position of the piece of ground both globally and relative to the mobile device based on a location of the mobile device, an orientation of the mobile device, and a displacement of the piece of ground from the mobile device using the distance calculation component and positioning system of the mobile device.

6. The computer-implemented method of claim 3 wherein the request for the set of agricultural data comprises a characteristic of the piece of ground at a particular geographic location, and wherein -superimposing the visual indicia over the image of the piece of ground comprises:

superimposing the visual indicia of the drain tile location and the characteristic of the piece of ground over the image of the piece of ground currently visible through the viewing component.

7. The computer-implemented method of claim 3 wherein displaying the real-time feed of the agricultural item comprises displaying a plurality of user actuatable input mechanisms, each corresponding to a different set of agricultural data and wherein initiating the request comprises:

receiving user actuation of at least one of the plurality of user actuatable input mechanisms; and initiating the request for the set of agricultural data based on the at least one of the plurality of user actuatable input mechanisms.

8. The computer-implemented method of claim 1 wherein receiving the agricultural data comprises:

receiving the agricultural data from a remote agricultural data service.

9. The computer-implemented method of claim 1 wherein receiving the agricultural data comprises:

receiving the agricultural data from a cloud-based agricultural data service.

10. The computer-implemented method of claim 1 wherein receiving agricultural data comprises:

receiving the agricultural data from an agronomist.

* * * * *